(12) United States Patent
Ishii

(10) Patent No.: US 7,178,614 B2
(45) Date of Patent: Feb. 20, 2007

(54) TRAVELING APPARATUS AND METHOD FOR CONTROLLING THEREOF

(75) Inventor: Shinji Ishii, Kanagawa (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 10/935,621

(22) Filed: Sep. 8, 2004

(65) Prior Publication Data
US 2005/0092533 A1    May 5, 2005

(30) Foreign Application Priority Data
Sep. 12, 2003   (JP)  ............................ P2003-322042

(51) Int. Cl.
*H02J 7/00*        (2006.01)
(52) U.S. Cl. ........................ 180/7.1; 180/218; 320/119
(58) Field of Classification Search ................. 180/7.1, 180/65.1, 65.3, 218, 220; 280/5.507; 320/118–122
See application file for complete search history.

(56) References Cited

U.S. PATENT DOCUMENTS

| | | | | |
|---|---|---|---|---|
| 5,850,136 | A | * | 12/1998 | Kaneko ........................ 320/119 |
| 5,939,865 | A | * | 8/1999 | McGrath et al. .............. 320/156 |
| 5,965,991 | A | * | 10/1999 | Koike et al. .................. 318/139 |
| 6,247,548 | B1 | * | 6/2001 | Hayashi et al. ............... 180/206 |
| 6,320,336 | B1 | * | 11/2001 | Eguchi ........................ 318/139 |
| 6,367,817 | B1 | * | 4/2002 | Kamen et al. ............ 280/5.507 |
| 6,562,511 | B2 | * | 5/2003 | Daroux et al. ............... 429/144 |
| 6,866,107 | B2 | * | 3/2005 | Heinzmann et al. ......... 180/7.1 |

FOREIGN PATENT DOCUMENTS

JP           2003089375 A        3/2003

* cited by examiner

*Primary Examiner*—Lesley D. Morris
*Assistant Examiner*—L Lum
(74) *Attorney, Agent, or Firm*—Oblon, Spivak, McClelland, Maier & Neustadt, P.C.

(57) ABSTRACT

A traveling apparatus and a method for controlling thereof performs efficient charging with regenerative electrical power. An angle $\theta_0$ of a table (not illustrated) is detected by a gyroscopic sensor and an acceleration sensor to be supplied to a central control unit. Then, positional command signals Pref1(t) and Pref2(t) formed are supplied to motor control units which perform control of driving left and right motors respectively. Further, rotational positions $\theta m1$ and $\theta m2$ of the motors are respectively detected in rotary encoders, those det signals are fed back to the motor control units, and control is performed so as to comply with the positional command signals Pref1(t) and Pref2(t) formed in the central control unit. At the same time, a regenerative state is detected by comparing the rotational positions $\theta m1$ and $\theta m2$ with the positional command signals Pref1(t) and Pref2(t), and information thereon is transmitted to a regenerative charging circuit by serial communication to perform a control of discharging and charging a secondary battery (battery).

17 Claims, 19 Drawing Sheets

TRAVELING APPARATUS AND METHOD FOR CONTROLLING THEREOF

BACKGROUND OF THE INVENTION

1. Field of the Invention

The present invention relates to a traveling apparatus suitable for use in, for example, a two-wheeled traveling vehicle on which a man rides and to a method for controlling thereof; specifically, relates to the apparatus and method in which charging with regenerative energy that is, for example, generated when decelerating or traveling a downward slope is efficiently performed to obtain excellent traveling.

2. Description of the Related Art

For example, a two-wheeled traveling vehicle on which a man rides has been proposed (for example, refer to a patent reference 1).

Further, in electric vehicles, there is one which charges with regenerative energy (for example, refer to a patent reference 2).

However, since a switching control is performed in the above described technology using signals, for example, from an accelerator and a brake when charging with regenerative energy is performed, this technology cannot be applied to a system without an accelerator and a brake.

[Patent reference 1] U.S. Pat. No. 6288505 Specification
[Patent reference 2] Japanese Published Patent Application No. 2000-253503

For example, the applicant of the present invention has previously proposed a traveling apparatus described hereunder (Japanese Patent Application No. 2003-168224) as a two-wheeled traveling vehicle on which a man rides.

First, FIG. 1 is a perspective view showing an external appearance of an example of a coaxial two-wheeled vehicle which has been proposed by the applicant of the present invention. A pair of wheels 3 (a right wheel 3R and a left wheel 3L) is fixed to both ends of an axle 2 in the coaxial two-wheeled vehicle 1 shown in FIG. 1. The wheel 3 is formed of a rubber material having flexibility, and the inside thereof is filled with air, nitrogen gas or the like. With adjusting pressure of the gas to adjust the flexibility of the wheel 3, vibration of a body of the vehicle can be absorbed and vibration caused by an unevenness of a road surface or a shock caused by a level difference can be reduced.

Further, a base 4 is supported by the axle 2 under a board where, for example, a man stands, to be capable of making an inclined movement around the axle 2, and a chassis having an approximately rectangular parallelepiped shape in which a control unit described later on and the like are stored is joined to the base 4. Note that, in the following explanation, a midpoint of the axle 2 connecting both wheels is assumed to be the origin 0 of an X-Y-Z coordinate system; and it is defined that the direction which passes through the origin 0 and is parallel to a principal plane of the base 4 and also is orthogonal to the axle 2 is an X axis or a roll axis, the direction of the axle passing through the origin 0 is a Y axis or a pitch axis and the direction passing though the origin 0 which is orthogonal to the principal plane of the base 4 is a Z axis or a yaw axis. Further, it is defined that a forward direction of the coaxial two-wheeled vehicle 1 is a positive direction of the X axis, a left direction thereof is a positive direction of the Y axis and an upper direction thereof is a positive direction of the Z axis, respectively.

As shown in FIG. 2, motors 10 (10R and 10L) capable of rotating in forward and reverse directions are mounted on the base 4, and rotary encoders 11 (11R and 11L) for detecting a rotational position of the motors 10 are provided adjacently to the motors 10. In addition, reducers 12 (12R and 12L) including a gear or a timing belt are provided between the motors 10 and the wheels 3 so that a rotation of the motors 10 can be transmitted to the wheels 3 through the reducers 12 and a joint (not shown).

Furthermore, various other sensors than a gyroscopic sensor 13 for detecting angular velocities $\omega p$ and $\omega yaw$ around the pitch axis and the yaw axis of the base 4, such as an acceleration sensor 14 for detecting linear accelerations Ax, Ay and Az in the directions of X, Y and Z axes and for detecting angular accelerations $\alpha p$, $\alpha r$ and $\alpha yaw$ around the pitch axis, the roll axis and the yaw axis, a pressure sensor 15 for detecting a load weight on the base 4 and the like are incorporated in the base 4.

Among the above sensors, the pressure sensors 15 are provided at four corners between a support table 4a and a movable table 4b constituting the board of the base 4 as shown in a plan view of FIG. 3A and a side view of FIG. 3B, so that the barycentric coordinate (Xg, Yg) of a load on the base 4 and also a load weight Wg thereof can be detected from sensor signals of those four pressure sensors $15_1$, $15_2$, $15_3$ and $15_4$.

Specifically, when the sensor signals of the pressure sensors $15_1$ through $15_4$ are $PS_1$, $PS_2$, $PS_3$ and $PS_4$, respectively, and also when its own weight of the base 4 applied to the pressure sensors $15_1$ through $15_4$ is $W_0$ in a state with no load, the load weight Wg can be obtained as shown in the following formula (1).

[Numerical Expression 1]

$$W_g = PS_1 + PS_2 + PS_3 + PS_4 - W_0 \tag{1}$$

Also, when the respective coordinates of the pressure sensors $15_1$, $15_2$, $15_3$ and $15_4$ are $(X_{ps}, Y_{ps})$ $(-X_{ps}, Y_{ps})$ $(-X_{ps}, -Y_{ps})$ and $(X_{ps}, -Y_{ps})$, the barycentric coordinate (Xg, Yg) can be obtained as shown in the following formula (2).

[Numerical Expression 2]

$$\begin{cases} X_g = X_{ps} * (W1 - W2)/(W1 + W2) \\ Y_g = Y_{ps} * (W3 - W4)/(W3 + W4) \end{cases} \tag{2}$$

wherein $$\begin{cases} W1 = (PS_1 + PS_4)/2 - W_{14} \\ W2 = (PS_2 + PS_3)/2 - W_{23} \\ W3 = (PS_1 + PS_2)/2 - W_{12} \\ W4 = (PS_3 + PS_4)/2 - W_{34} \end{cases}$$

In the formula (2), $W_{14}$ denotes its own weight in a state with no load applied to the pressure sensors $15_1$ and $15_4$, $W_{23}$ denotes its own weight applied to the pressure sensors $15_2$ and $15_3$ in the state with no load, $W_{12}$ denotes its own weight applied to the pressure sensors $15_1$ and $15_2$ in the state with no load, and $W_{34}$ denotes its own weight applied to the pressure sensors $15_3$ and $15_4$ in the state with no load.

Accordingly, since a load induced torque T1 caused by the load on the base 4 can be thus calculated using the pressure sensors 15, it becomes possible to maintain a balance on the base 4 to stabilize a posture when the moment of reaction is given to the motor 10.

Furthermore, a control unit 16 including a microcomputer is mounted on the lower chassis of the base 4, to which various sensor signals and detection signals are input. The control unit 16 performs control based on those input signals so as to generate a motor torque that makes a vehicle body move forward, move backward and turn while maintaining a pitch axis angle and a yaw axis angle of the base 4 at an appropriate value as described later on.

Further as shown in FIG. 4, the coaxial two-wheeled vehicle 1 has a structure in which a weight center M of the base 4 that is capable of making an inclined movement around the axle 2 can be positioned lower than the axle 2. Therefore, the barycentric position of the vehicle body is maintained at the most stable position even when not moving, and the coaxial two-wheeled vehicle 1 may not topple over easily. Note that, although in FIG. 4 a height of the upper surface of the base 4 is higher than the axle 2, the upper surface of the base 4 may be lower than the axle 2.

Hereupon, an explanation is made with respect to a concept for control to maintain a posture on the base 4. As shown in FIG. 5, when a motor torque Tm is controlled to generate the same moment as the load induced torque $T_1$ caused by a load on the base 4 which is, for example, a man's weight, the base 4 is balanced like a seesaw with a center as a fulcrum thereof. A point corresponding to the fulcrum for maintaining the balance, that is, a point where the rotational moment around the axle 2 becomes zero is called a ZMP (Zero Moment Point). When the ZMP coincides with a ground-contacting point of the wheel 3 with a road surface, or when the ZMP is within a ground-contacting surface with the road surface, the balance is kept to maintain the posture on the base 4.

In the case where a man having a weight Wh rides on the coaxial two-wheeled vehicle 1, the weight center M of the base 4 inclines about the axle 2a as a center thereof in accordance with the man's inclined angle θ as shown in FIG. 6. At this time, an axle torque $T_0$ to keep the balance of the axle 2 is expressed with the following formula (3), and the motor torque Tm for maintaining the posture is shown by $T_0/N$, where a reduction ratio of the reducer 12 is N:1.

[Numerical Expression 3]

$$T_0 = Wh^* \sin\theta - Wm^* \sin\theta \qquad (3)$$

Thus, since the above described coaxial two-wheeled vehicle 1 has a structure in which the weight center M of the base 4 is positioned lower than the axle 2 as described above, only adding a difference between the moment by the man's weight Wh and the moment by the weight Wm of the base 4 as the axle torque $T_0$ is needed as shown in the formula (3), so that the balance is maintained with a comparatively small motor torque.

Further, a dynamic model for maintaining a posture on the base 4 is explained in detail using an X-Z coordinate system shown in FIG. 7. Hereupon, to make the explanation simple, it is considered in FIG. 7 that one wheel 3 is provided. Further, the wheel 3, the base 4 and a man on the base 4 are respectively regarded as a link, and barycentric position coordinates thereof are $(x_0, z_0)$, $(x_1, z_1)$ and $(x_2, z_2)$, respectively. Furthermore, the mass of each link is $m_0$, $m_1$ and $m_2$, respectively, and inertial moments thereof are $I_0$, $I_1$ and $I_2$.

Each kinetic momentum of the i-th link (i=0, 1, 2) around the defined point Ω (σ, φ) is expressed with the following formula (4), when the barycentric coordinate is $(x_i, z_i)$. Here, one dot put on x and z in the formula (4) denotes a first-stage differentiation of x and z.

[Numerical Expression 4]

$$Ii^*\omega i + mi^*\dot{x}i(\phi - zi) - mi^*\dot{z}i(\sigma - xi) \qquad (4)$$

Therefore, the moment of all links by the inertial force is expressed with the following formula (5). Hereupon, two dots put on x and z in the formula (5) denote a second-stage differentiation of x and z. Further, the moment of all links by the gravity is expressed with the following formula (6) when gravity acceleration is g.

[Numerical Expression 5]

$$\sum_{i=0}^{n} (Ii * \dot{\omega}i + mi * \ddot{x}i(\varphi - zi) - mi * \ddot{z}i(\sigma - xi)) \qquad (5)$$

$$\sum_{i=0}^{n} mi(\sigma - xi)g \qquad (6)$$

As shown in a formula (7), the moment MΩ around the point Ω (σ, φ) is given by a sum of the moment by the inertial force and the moment by the gravity.

[Numerical Expression 6]

$$M\Omega = \qquad (7)$$
$$\sum_{i=0}^{n} Ii * \dot{\omega}i + \sum_{i=0}^{n} mi(\ddot{x}i(\varphi - zi) - mi * \ddot{z}i(\sigma - xi)) + \sum_{i=0}^{n} mi(\sigma - xi)g$$

With excluding the moment by the gravity for the wheel 3 having the mass $m_0$, the above described moment MΩ becomes the moment Ma around the axle 2 by taking the point Ω (σ, φ) as the origin. This moment Ma around the axle 2 is expressed with the following formula (8).

[Numerical Expression 7]

$$Ma = \sum_{i=0}^{n} Ii * \dot{\omega}i + \sum_{i=0}^{n} mi(\ddot{z}i * xi - \ddot{x}i * zi) - \sum_{i=0}^{n} mi * xi * g \qquad (8)$$

To express the above described moment MΩ using the moment Ma, it is given by the following formula (9) when $X_0=0$, that is, when the barycentric position of the wheel 3 is on the axle 2.

[Numerical Expression 8]

$$M\Omega = Ma - \sum_{i=0}^{n} mi(\ddot{z}i - g)\sigma + \sum_{i=0}^{n} mi * \ddot{x}i * \psi \qquad (9)$$

Here, the ZMP is defined as a point on a floor surface where the moment MΩ is zero. Then, if a height of the axle 2 is h and the coordinate of the ZMP is (σzmp, −h) to be substituted for the formula (7), the formula becomes the following formula (10). The ZMP can be expressed with a link position, an acceleration and the mass by solving the formula (10) with respect to σzmp.

[Numerical Expression 9]

$$O = \sum_{i=0}^{n} Ii * \dot{\omega}i + \sum_{i=0}^{n} mi(-\ddot{x}i(h+zi) - \ddot{z}i(\sigma zmp - xi)) + \sum_{i=0}^{n} mi(\sigma zmp - xi)g \quad (10)$$

Moreover, if the coordinate (σzmp, −h) of the ZMP is substituted for the above described formula (9), the following formula (11) is obtained. The formula (11) expresses a balanced moment around the axle 2.

[Numerical Expression 10]

$$O = Ma - \sum_{i=0}^{n} mi(\ddot{z}i - g)\sigma zmp - \sum_{i=0}^{n} mi * \ddot{x}i * h \quad (11)$$

Hereupon, a force which acts on the ZMP is illustrated in FIG. 8. In FIG. 8, FN denotes a floor reactive force, FT denotes a rotational friction force and F denotes a composite vector of the FN and the FT. In addition, though actually distributed over the whole ground-contacting surface of the wheel 3, the floor reactive force FN is expressed in FIG. 8 as the one concentrated on the ZMP. Based on this diagram, a formula expressing the balanced moment around the axle 2 is obtained as the following formula (12).

[Numerical Expression 11]

$$FN*\sigma zmp + FT*h + \tau 0 = 0 \quad (12)$$

Here, the formula (12) becomes the same as the above described formula (11), when the following formulas (13) through (15) are substituted.

[Numerical Expression 12]

$$T_0 = Ma \quad (13)$$

$$FN = -\sum_{i=0}^{n} mi(\ddot{z}i - g) \quad (14)$$

$$FT = -\sum_{i=0}^{n} mi * \ddot{x}i \quad (15)$$

In order to stabilize the posture on the base 4, it is only required that the σzmp becomes 0 in the formula (12). In other words, the posture can be maintained if the axle torque $T_0 = -FT*h$ is obtained. Therefore, with controlling state variables shown in the following formula (16) that satisfies $T_0 = FT = 0$, the posture can be stabilized.

[Numerical Expression 13]

$$(xi, \dot{x}i, \ddot{x}i) = (0, 0, 0) \quad (16)$$

Hereupon, $x_0$ and $x_1$ can be determined uniquely in accordance with a mechanical structure; however, $m_2$, $I_2$, $x_2$ and $z_2$ are variable, because those values belong to a man. The moment Mt on the base 4 with those m2, I2, x2 and z2 is given by the following formula (17). Here, the base 4 is assumed to be kept horizontal as shown in FIG. 9.

[Numerical Expression 14]

$$Mt = I2*\dot{\omega}2 - m2*\ddot{Z}2*x2 - m2*\ddot{x}2*(z2-L) - m2*x2*g \quad (17)$$

Hereupon, since the angular velocity ω2 is small enough when the load is a man, ω2≈0 is approximated, and the moment Mt becomes zero when $x_2$ and a second-stage differentiation value thereof are made to be zero in a formula (18). Making $x_2$ and the second-stage differentiation value thereof become zero can be considered equal to controlling $x_0$ and $x_1$ so that the load induced torque $T_1$ on the base 4 become zero. Further, the moment Mt by the load induced torque T1 is equivalent to a force F2 acting to a point of action (xf, L) on the base 4. Therefore, if $x_0$ and $x_1$ to make the xf zero is given, $T_1$ becomes zero and the condition to keep the posture stable can be satisfied.

When a signal of the gyroscopic sensor on the base 4 is controlled through feed-back to maintain $x_0 = x_1$ by giving the motor torque Tm as shown in FIG. 9, the posture can be kept stable by controlling the motor torque Tm to become $xf = x_0$.

Specifically, when an error Ef is $Ef = xf - x_0$, in case of Ef>0 the motor torque Tm is negative to displace the $x_0$ in the positive direction to make the vehicle move forward and in case of Ef<0 the motor torque Tm is positive to displace the $x_0$ in the negative direction to make the vehicle move backward, so that the error Ef can be reduced to zero. In other words, when $A_0$ is a positive constant and the motor torque $Tm = -A_0*Ef$ is given to reduce the Ef to zero, the posture can be kept stable.

In practice, in the case where the base 4 inclines by an angle of $\theta_0$ around the pitch axis, since the load induced torque T1 (=Mτ×L) is actually generated by a man having a weight M, as shown in FIG. 10, by controlling the motor torque Tm to give the axle torque $T_0$ in the opposite direction to the load induced torque T1 the ZMP can be made to coincide with the ground-contacting contacting point of the wheel 3 to keep the posture stable.

Hereupon, when a man rides on the base 4, a force applied to soles is fluctuated usually in a cycle of 1 to 2 seconds in order to maintain the posture though there is an individual difference, and therefore, the load induced torque T1 by the man's weight changes accordingly. Therefore, it is necessary to add to the motor 10 such torque that can maintain a balance in real time so as to keep an angle of the base 4 constant with respect to a load fluctuation.

Then, in order to balance out such load fluctuation in real time, the above described coaxial two-wheeled vehicle 1 has a control mechanism shown in FIG. 11 inside the control unit 16. In FIG. 11, difference between a present base angel $\theta_0$ detected by the gyroscopic sensor 13 and by the acceleration sensor 14, and a base angle command θref that is a postural command is obtained in a subtractor 20, and the difference is supplied to a postural controller 21. The postural controller 21 computes a motor torque current value Tgyr [A] from the base angle command θref and from the present base angle $\theta_0$.

Further, in a regulator 22, the load induced torque T1 is estimated using sensor signals $PS_1$, $PS_2$, $PS_3$ and $PS_4$ from the pressure sensors 15, and to balance out the load induced torque T1, an estimated load induced torque current value $T_1'/Km$ [A] is computed. Here, Km is a motor constant [N m/A]. When the barycentric coordinate of the load is (Xg, Yg) and the load weight is Wg, the estimated load induced torque T1' is expressed as the following formula (18).

[Numerical Expression 15]

$$T1' = Wg*Xg/2 \quad (18)$$

Then, a difference between the motor torque current value Tgyr and the estimated load induced torque current value T1'/Km is obtained in a subtractor 23, and the difference is supplied to a motor 24 as motor current I[A]. The motor 24 generates a motor torque Tm from the rotation using the motor current I, and the motor torque Tm and the load induced torque T1 are added in an adder 25 to be transmitted to a base 26.

Thus, the base angle can be kept fixed against the load fluctuation when being stopped by adding to the motor 24 the motor torque Tm to balance out the load induced torque T1.

With the control mechanism described above, a postural stabilization control can be performed; however, in order to travel in this state, a control mechanism for traveling is further required. Therefore, the above described coaxial two-wheeled vehicle 1 actually has a control mechanism of two-wheeled structure in which a motor torque for postural stabilization control and a motor torque for traveling control are obtained independently.

A physical model for such a control mechanism of two-wheeled structure is shown in FIG. 12. Note that, to make the explanation simple, it is considered in FIG. 12 that only one wheel 3 is provided. As shown in FIG. 12, various sensors such as the gyroscopic sensor 13, the acceleration sensor 14, the pressure sensor 15 and the like are incorporated in the base 4, under which a motor stator 30, a rotary encoder 31 and a motor rotor 32 are provided, and the rotation of the motor rotor 32 is transmitted to the wheel 3 through a reducer 33 and a joint 34.

A postural controller/regulator 40 computes the above described motor torque Tgyr and estimated load induced torque T1' from the base angle command θref that is a postural command, the present base angle $θ_0$ detected by the gyroscopic sensor 13 and the acceleration sensor 14, and also the sensor signals $PS_1$, $PS_2$, $PS_3$ and $PS_4$ of the pressure sensors 15, Further, a motor controller 41 computes a motor torque for traveling from the rotational position command Pref of the motor rotor 32 which is a travel command and from the present rotational position θr of the motor rotor 32 detected by the rotary encoder 31.

Then, the motor torque Tgyr, the estimated load induced torque T1' and also the motor torque for traveling are added in an adder 42, and the added value is supplied to the motor rotor 32.

Here, the above described base angle command θref is a target value of the base angle which is set in accordance with an acceleration Ax in the X-axis direction so that a rider can ride on stably. Specifically, the target value θref is respectively set so that the base 4 becomes horizontal when the X-axis acceleration Ax is zero; the base 4 is inclined forward when the X-axis acceleration Ax is positive; and the base 4 is inclined backward when the X-axis acceleration Ax is negative.

Then, with for example the positive X-axis acceleration Ax, the rider can keep his/her posture stable when the base 4 is inclined so that the ZMP can be positioned in a direction of a composite vector of an inertial force and a gravitational force as shown in FIG. 13. In addition, the base angle command θref changes in proportion to the X-axis acceleration Ax.

A block diagram of the control mechanism is shown in FIG. 14. A difference between the base angle command θref that is a postural command and the present base angle $θ_0$ detected by the gyroscopic sensor 13 (and the acceleration sensor 14) is obtained in a subtractor 50, and the difference is supplied to a postural controller 51. The postural controller 51 computes the motor torque Tgyr from the base angle command θref and from the present base angle $θ_0$, and supplies the motor torque Tgyr to an adder 54.

On the other hand, a difference between the rotational position command Pref of the motor rotor 57 which is a travel command and a present rotational position θr of a motor rotor 57 detected by a rotary encoder 58 is obtained in a subtractor 52, and the difference is supplied to a motor controller 53. The motor controller 53 computes the motor torque for traveling from the rotational position command Pref and from the present rotational position θr, and supplies the motor torque to the adder 54.

Moreover, when the load induced torque T1 is applied to the base 4, the sensor signals $PS_1$, $PS_2$, $PS_3$ and $PS_4$ of the pressure sensors 15 are supplied to a regulator 55, and the regulator 55 computes the above described estimated load induced torque T1' based on those sensor signals.

The motor torque Tgyr from the postural controller 51 and the motor torque from the motor controller 53 are added in the adder 54, and the estimated load induced torque T1' is subtracted from the added value in a subtractor 56. The result finally becomes the motor torque Tm and is supplied to the motor rotor 57. A reactive force of the motor torque Tm and the load induced torque T1 are added in an adder 59, and the added value is given to a motor stator/base 60.

A rotational control is performed on the motor rotor 57 in accordance with the motor torque Tm. The rotational position θr of the motor rotor 57 is converted into 1/N by a reducer 61 having a reduction ratio of N:1 to be transmitted to the wheel 3. Specifically, a rotational position θw of the wheel 3 is 1/N of the rotational position θr of the motor rotor 57. The rotary encoder 58 detects the rotational position θr of the motor rotor 57, and the detected signal is supplied to the subtractor 52.

On the other hand, although the added value of the reactive force of the motor torque Tm and the load induced torque T1 is applied to the motor stator/base 60 as described above, an inclined movement of the motor stator/base 60 can be prevented, because both of them are mutually canceled out.

FIG. 15 shows the processing of the block diagram shown in FIG. 14 as a mathematical model using a Laplace operator. As described above, the difference between the base angle command θref and the present base angle $θ_0$ is given to the postural controller 51, and the difference between the rotational position command Pref of the motor rotor 57 and the present rotational position θr is given to the motor controller 53. In the postural controller 51 and motor controller 53, each motor torque is computed by a feed-back control which performs, for example, a PID (proportional, integral and differential) operation.

Specifically, $Kp_0$ and $Kp_1$ become proportional gains, $Ki_0$ and $Ki_1$ become integral gains, and $Kd_0$ and $Kd_1$ become differential gains. Depending on those control gains, following characteristics of a motor which responds to the postural command θref and to the travel command Pref may vary. For example, when the proportional gains $Kp_0$ and $Kp_1$ are made small, the motor rotor 57 moves with a slow delay in following, and when the proportional gains $Kp_0$ and $Kp_1$ are made large, the motor rotor 57 moves at high velocity in following. Thus, by changing the control gain, the amount of difference between the postural command θref and the travel command Pref, and an actual movement and response time can be regulated.

Moreover, the motor torque Tm obtained by subtracting the estimated load induced torque T1' from the added value of the motor torque from the posture controller 51 and the motor torque from the motor controller 53 is supplied to the motor rotor 57 to rotate only by the rotational angle θr. Here, Jr is inertia of the motor rotor 57 and Dr is a viscosity resistance (damper coefficient) of the motor rotor 57.

On the other hand, although the added value of the reactive force of the motor torque Tm and the load induced torque T1 is applied to the motor stator/base 60 as described above, the inclined movement is prevented by mutually canceled out. Here, J is inertia of the motor stator/base 60 and D is a viscosity resistance (damper coefficient) of the motor stator/base 60.

FIG. 16, for example, shows in detail the mathematical model shown in FIG. 15. As shown in FIG. 16, a postural controller 70 performs the PID control on the difference between the base angle command θref and the present base angle $θ_0$ to generate the motor torque Tgyr for postural control, and the motor controller 71 performs the PID control on the difference between the rotational position command Pref of the motor 10 and the present rotational position θr to generate the motor torque for traveling control.

Further, a regulator 72 generates the estimated load induced torque T1' from the sensor signal of the pressure sensor 15, The respective torque is added in an adder 73, and the obtained motor torque Tm is supplied to the motor 10. The motor 10 is driven to rotate by the motor torque Tm, and the rotation is converted to 1/16 by a reducer 74 having a reduction ratio of 16:1 to be transmitted to the wheel 3.

Referring to FIGS. 12 through 16, the explanation is made in which only one wheel 3 is considered to be provided, to make the explanation simple; however, actually the coaxial two-wheeled vehicle 1 has the right and left wheels of 3R and 3L, and the motor controller 53 is provided independently to the right and the left, while the postural controller 51 shown, for example, in FIG. 14 is used in common by the right and left wheels of 3R and 3L.

A block diagram of a control mechanism in this case is shown in FIG. 17. A sensor value ωp from the gyroscopic sensor 13 is sent to an angle calculator 82 through a band-pass filter (BPF) 80 having a passing band of, for example, 0.1 through 50 Hz, and a sensor value αp from the acceleration sensor 14 is sent to the angle calculator 82 through a low-pass filter (LPF) 81 having a cut-off frequency of, for example, 0.1 Hz. In the angle calculator 82, the present base angle $θ_0$ is computed based on those sensor values.

Further, difference between the base angle command θref that is the postural command and the present base angle $θ_0$ is obtained in a subtractor 83, and the difference is supplied to a postural controller 84. The postural controller 84 computes the above described motor torque Tgyr from the base angle command θref and from the present base angle $θ_0$.

On the other hand, difference between a rotational position command Prefr of a motor rotor 92R that is a travel command for the right wheel 3R and a present rotational position θr of the motor rotor 92R detected by a rotary encoder 93R is obtained in a subtractor 85R, and the difference is supplied to a position proportional controller 86R. The position proportional controller 86R performs a position proportional (P) control on the difference, and a result of the proportional control is supplied to a subtractor 87R.

Moreover, a differentiation unit 88R differentiates the rotational position θr of the motor rotor 92R supplied from the rotary encoder 93R, and the result is supplied to the subtractor 87R. Then, difference between the result of the proportional control from the position proportional controller 86R and the result of the differentiation from differentiation unit 88R is obtained in the subtractor 87R, and the difference is supplied to a velocity proportional controller 89R. The velocity proportional controller 89R performs a velocity proportional (P) control on the difference, and the result is supplied to an adder 90R.

The result of the proportional control, the motor torque Tgyr, and the estimated load induced torque T1' obtained from the sensor signals $PS_1$, $PS_2$, $PS_3$ and $PS_4$ of the pressure sensors 15 in a regulator 94 are added in the adder 90R, and the added value is supplied to a current control amplifier 91R. The current control amplifier 91R generates motor current based on the added value to drive the motor rotor 92R. The rotational position of the motor rotor 92R is supplied to the differentiation unit 88R as well as the subtractor 85R. Since the same explanation will be applied similarly to the left wheel 3L, an explanation thereof is omitted.

Thus, the above described coaxial two-wheeled vehicle 1 has a common control mechanism for postural stabilization control to the right and left wheels 3R and 3L and has an control mechanism for traveling control to the right and left wheels, respectively, and since the control is performed independently, both the postural stabilization control and the traveling control can be stably performed.

Hereinafter, velocity control in the above described coaxial two-wheeled vehicle 1 will be explained.

As described above, the barycentric coordinate (Xg, Yg) of the load on the base 4 and the load weight Wg are detected from the respective sensor signals $PS_1$, $PS_2$, $PS_3$ and $PS_4$ of the four pressure sensors $15_1$ through $15_4$ provided at four corners of the base 4 in the above coaxial two-wheeled vehicle 1 to obtain the load induced torque T1; and this barycentric coordinate (Xg, Yg) is further used as a command to control a travel direction and velocity. Specifically, when the load weight Wg is larger than a predetermined value, a velocity command Vx is changed based on the X-coordinate Xg of the barycentric position.

FIG. 18 shows the above aspect. Here, the range from $X_3$ to $X_1$ in FIG. 18 is an area in which the coaxial two-wheeled vehicle 1 is halted, and travel velocity is commanded to be zero within the range. It is preferable that the range be within an X-coordinate range of ground-contacting surface of the wheel 3 with a road surface. In this case, for example, when the load weight Wg is large or when gas pressure of the wheel 3 is low, a ground-contacting area of the wheel 3 with the road surface becomes large and therefore, the range in which the vehicle is halted also becomes large. Providing such range in which the vehicle is halted (dead zone) prevents the vehicle body from moving forward and moving backward due to a slight movement of the barycenter which is not intended by a rider.

When the X-coordinate becomes larger than $X_1$, velocity is commanded to increase in accordance with the value of X-coordinate until reaching the maximum forward velocity SfMAX. Moreover, when the value of X-coordinate becomes larger than $X_2$, the velocity is reduced to stop forcibly until the posture is stabilized again within the stop area. Thus, providing the area for forcibly reducing the velocity to stop can secure a safety of the rider when traveling at the maximum velocity.

Similarly, when the value of X-coordinate becomes smaller than $X_3$, the commanded velocity increases in accordance with the value of X-coordinate until reaching the maximum backward velocity SbMAX. In addition, it is preferable that the maximum backward velocity SbMAX be less than the maximum forward velocity SfMAX. Moreover, when the value of X-coordinate becomes $X_4$ or less, the velocity is forcibly reduced to stop until the posture is stabilized again within the stop area.

When the X-coordinate is in the range from $X_1$ to $X_2$ or from $X_3$ to $X_4$, a rotational position command Prefr of the motor 10R and a rotational position command Pref1 of the motor 10L are generated using, for example, the following formula (19) in accordance with the X-coordinate Xg. Hereupon, $G_0$ in the formula (19) is a constant positive gain and can be variable in accordance with the load weight Wg, for example.

[Numerical Expression 16]

$$Prefr = Pref1 = Xg * G_0 \qquad (19)$$

Further, when a velocity command is $V_{x0}$ at time t=0 and the velocity command is $V_{x1}$ at time $t=t_1$, it is preferable that acceleration be continuously performed to travel so as not to generate a mechanical resonant vibration. In this case, when the time before reaching $V_{x1}$ is $\Delta t$, a travel velocity command Vref(t) at a time t ($0 \leq t \leq t1$) can be computed by the following formula (20), for example.

[Numerical Expression 17]

$$Vref(t) = (1/4)t^4 - (2/3)\Delta t * t^3 + (1/2)\Delta t^2 * t^2 + V_{x0} \qquad (20)$$

At this time, the rotational position command Pref(t) of the motor 10 becomes an integrated value of the travel velocity command Vref(t) in the formula (20) and is obtained with a quintic function as shown in the following formula (21). Here, $Pref_0$ in the formula (21) is the rotational position command at the time t=0.

[Numerical Expression 18]

$$Pref(t) = \int Vref(t)dt + Pref_0 \qquad (21)$$
$$= (1/20)t^5 - (2/12)\Delta t * t^4 + (1/6)\Delta t^2 * t^3 + Pref_0$$

Moreover, not only moving forward and moving backward but also a turn velocity command Vr can be changed as shown, for example, in FIG. 19 based on the Y-coordinate Yg of the barycentric position when the load weight Wg is a predetermined value or more. Here, the range from $-Y_1$ to $Y_1$ in FIG. 19 is a stop area, and a commanded turn velocity is zero within the range.

In addition, the stop area can arbitrarily be set in the vicinity of the origin O. Thus, providing the stop area (dead zone), the vehicle can be prevented from making a turn due to a slight shift of the barycenter which is not intended by a rider. When the value of Y-coordinate becomes more than Y1, the commanded turn velocity increases in accordance with the value of Y-coordinate until reaching a right-turn maximum velocity CWMAX. Similarly, when the value of Y-coordinate becomes less than $-Y_1$, the commanded turn velocity increases in accordance with the value of Y-coordinate until reaching a left-turn maximum velocity CCW-MAX.

When the value of Y-coordinate is $Y_1$ or more or $-Y_1$ or less, the rotational position command Rrefr of the motor 10R and the rotational position command Rref1 of the motor 10L are generated in accordance with the Y-coordinate Yg. When a travel velocity is zero, the rotational position command Rrefr of the motor 10R and the rotational position command Rref1 of the motor 10L become the opposite phase command as shown in the following formula (22), for example.

Hereupon, $G_1$ is a positive constant gain in the formula (22) and can be made variable in accordance with the load weight Wg, for example.

[Numerical Expression 19]

$$Rrefr = -Rref1 = Y_g * G_1 \qquad (22)$$

On the other hand, when the travel velocity is not zero, the rotational position command Rrefr of the motor 10R and the rotational position command Rref1 of the motor 10L become the same phase command as shown in the following formulas (23) and (24), for example. Here, $G_2$ is a positive constant gain in the formulas (23) and (24), and can be made variable in accordance with the load weight Wg, for example.

[Numerical Expression 20]

$$Rrefr = Prefr + Y_g * G_2 \qquad (23)$$

$$Rref1 = Pref1 - Y_g * G_2 \qquad (24)$$

Hereupon, when traveling on a road surface which has an unevenness such as a road surface of an unleveled ground or on an inclined road surface, it becomes difficult to travel in the target direction given by the rotational position commands to the right and left motors 10R and 10L, and there is a possibility that a difference arises between the target direction and an actual travel direction. Moreover, when effective diameters of the wheels 3 become unequal due to a difference in gas pressure of the right and left wheels 3R and 3L, there is a possibility that the similar discrepancy arises between the target direction and the actual travel direction.

Then, in the above described coaxial two-wheeled vehicle 1, an actual travel direction is detected by the gyroscopic sensor 13 which detects the angular velocity ωyaw around the yaw axis and each rotational velocity of the right and left motors 10R and 10L is independently controlled, so that discrepancy between the target direction and the actual travel direction can be corrected.

An example shown in FIG. 20 is explained in which the effective diameter of the left wheel 3L is shorter than that of the right wheel 3R and $\omega yaw_1$ [rad/sec] is detected as a gyroscopic sensor signal around the yaw axis when moving forward. In such case, when rotational velocity commands Vrefr and Vref1 are added to get the average $Vref_0$, the vehicle can move forward by correcting the rotational velocity commands Vrefr and Vref1 respectively supplied to the right and left motors 10R and 10L as shown in the following formulas (25) and (26). Hereupon, $K_0$ is a positive constant in the formulas (25) and (26).

[Numerical Expression 21]

$$Vrefr = Vref_0 - K_0 * \omega_{yaw1} \qquad (25)$$

$$Vref1 = Vref_0 + K_0 * \omega_{yaw1} \qquad (26)$$

Further, when Dref [rad/sec] is given as the target direction, the rotational velocity commands Vrefr and Vref1 are respectively supplied to the right and left wheels as shown in the following formulas (27) and (28).

[Numerical Expression 22]

$$Vrefr = Vref_0 - K_0(Dref - \omega_{yaw1}) \qquad (27)$$

$$Vref1 = Vref_0 + K_0(Dref - \omega_{yaw1}) \qquad (28)$$

The rotational velocity commands Vrefr and Vref1 obtained in this manner are respectively converted into the rotational position commands Prefr and Pref1 of the wheels by the following formulas (29) and (30). Here, in the formulas (29) and (30), k is an integer showing the number of sampling and Pref(k) indicates a rotational position command in k-th sampling.

[Numerical Expression 23]

$$Rrefr(k)=Prefr(k)+Vref_0 \quad (29)$$

$$Rrefl(k)=Prefl(k)+Vref_0 \quad (30)$$

Similarly, there is a possibility that a discrepancy arises in turn velocity due to a difference in gas pressure between the right and left wheels 3R and 3L, a difference in a road surface condition or the like, when making a turn. In this case also, an actual turn velocity is detected by the gyroscopic sensor 13 which detects the angular velocity ωyaw around the yaw axis to control independently each rotational velocity of the right and left motors 10r and 10L, so that a discrepancy between the targeted turn velocity and an actual turn velocity can be corrected.

An example is explained in which the effective diameter of the left wheel 3L is shorter than that of the right wheel 3R and $\omega_{yaw2}$ [rad/sec] is detected as the gyroscopic sensor signal around the yaw axis, when making a turn. When differentiated signals of the rotational position command Rrefr of the right wheel 3R and the rotational position command Rrefl of the left wheel 3L are Vrefr and Vrefl, respectively, a difference ωerr of the turn velocity is expressed in the following formula (31).

[Numerical Expression 24]

$$\omega_{err}=(Vrefl-Vrefr)-\omega_{yaw2} \quad (31)$$

In this case, the vehicle can make a turn as intended by correcting the rotational position commands Vrefr and Vrefl supplied to the right and left motors 10R and 10L as shown in the following formulas (32) and (33). Here, $G_3$ is a positive constant gain in the formulas (32) and (33) and can be made variable in accordance with the load weight Wg, for example.

[Numerical Expression 25]

$$Rrefr=Prefr+Y_g*G_2-\omega_{err}*G_3 \quad (32)$$

$$Rrefl=Prefl-Y_g*G_2-\omega_{err}*G_3 \quad (33)$$

Thus, in the above described coaxial two-wheeled vehicle 1, an actual travel direction and turn velocity are detected by the gyroscopic sensor 13 which detects the angular velocity ωyaw around the yaw axis to control independently each rotational velocity of the right and left motors 10R and 10L, so that the discrepancy between the target direction (turn velocity) and the travel direction (turn velocity) can be corrected.

The applicant of the present invention has previously proposed a traveling apparatus according to such coaxial two-wheeled vehicle as heretofore described.

Meanwhile, by providing in the above described mechanism a system including as energy source a rechargeable battery and a control unit for traveling by a motor, the motor consumes energy when the system accelerates and the motor is rotated by mechanical inertial energy to generate electrical power as regenerative energy when the system decelerates. Similarly, when a vehicle goes down a downward slope, the regenerative energy is generated in the same manner to generate the electric power.

Further, a unit in which the regenerative energy obtained in this manner is detected to be accumulated in a capacitor and a secondary battery is charged with the electric energy thereof is provided as a system incorporated in a vehicle, so that the control unit detects the regenerative energy in real time and the regenerative energy is automatically accumulated in the capacitor to charge the secondary battery.

However, in case of charging with the regenerative energy using the technology described in the patent reference 2, for example, the technology cannot be applied to a system without an accelerator and brake due to the reason that a switching control is performed, for example, using signals from the accelerator and the brake. On the other hand, a method can also be considered in which voltage at a motor terminal is judged and when it becomes higher than an applied voltage, regenerative energy is judged to be generated and switching is performed to charge; however, a response speed thereof is slow and efficient charging cannot be performed.

The present invention is made in view of the above problems and aims to solve a problem of a conventional apparatus in which a switching control is performed using signals of, for example, an accelerator and a brake when regenerative energy is charged and therefore, cannot be applied to a system without an accelerator and brake.

SUMMARY OF THE INVENTION

According to the present invention, rotational velocity of a wheel is set and the rotational velocity of the wheel is detected; and when the detected rotational velocity of the wheel is faster than the velocity that has been set, control of charging with regenerative electrical power is performed, so that extremely efficient charging with the regenerative electrical power can be performed.

According to an aspect of claim 1 of the present invention, rotational velocity of a wheel is set, and control of charging with regenerative electrical power is performed when the detected rotational velocity of the wheel is faster than the velocity that has been set, so that extremely efficient charging with the regenerative electrical power can be performed.

According to an aspect of claim 2 of the present invention, a plurality of wheels include two wheels having rotational axes disposed on a straight line, and keeping a chassis horizontal is included as an element in setting the rotational velocity of the plurality of wheels, so that stable traveling can be performed.

According to an aspect of claim 3 of the present invention, charging with regenerative energy is performed on a rechargeable battery in which a plurality of secondary battery cells are connected in series; a terminal for charging is provided for each of the secondary battery cells; and a control means performs control of selecting a terminal for charging to charge an arbitrary secondary battery cell when an amount of regenerative energy is small, so that excellent charging can be performed even if the amount of regenerative energy is not large.

According to an aspect of claim 4 of the present invention, charging with the regenerative energy is performed by either increasing or decreasing a voltage generated from the regenerative energy to be a predetermined charging voltage, so that excellent charging can be performed regardless of the amount of regenerative energy that is either large or small.

According to an aspect of claim 5 of the present invention, a safety protecting circuit is incorporated, with which overcharge is prevented by operating a regenerative resistance when a battery is fully charged with the regenerative energy, so that charging is safely performed without fail.

According to an aspect of claim 6 of the present invention, a temperature sensor is provided and the control means performs control of regulating a charging voltage by computing the charging voltage in accordance with a temperature of the secondary battery, so that one hundred charging is fully performed over a wide range of temperature.

According to an aspect of claim 7 of the present invention, setting rotational velocity of a plurality of wheels and the control of charging with the regenerative energy are individually performed by providing a respective control means, and high velocity data communication is mutually performed between those individual control means, so that stable and excellent traveling and charging can be performed.

According to an aspect of claim 8 of the present invention, rotational velocity of a wheel is set, and the rotational velocity of the wheel is detected; and when the detected rotational velocity of the wheel is faster than the velocity that has been set, a control of charging with regenerative electrical power is performed, so that extremely efficient charging with the regenerative electrical power can be performed.

According to an aspect of claim 9 of the present invention, a plurality of wheels include two wheels whose rotational axes are disposed on a straight line and keeping a chassis horizontal is included as an element in setting the rotational velocity of the plurality of wheels, so that stable traveling can be performed.

According to an aspect of claim 10 of the present invention, charging with regenerative energy is performed on a rechargeable battery in which a plurality of secondary battery cells are connected in series; a terminal for charging is provided for each of the secondary battery cells; and when the amount of regenerative energy is small, a terminal for charging is selected and control is performed to charge an arbitrary secondary battery cell, so that excellent charging can be performed even if the amount of regenerative energy is not large.

According to an aspect of claim 11 of the present invention, charging with the regenerative energy is performed by either increasing or decreasing a voltage generated from the regenerative energy to a predetermined charging voltage, so that excellent charging can be performed regardless of the amount of regenerative energy that is either large or small.

According to an aspect of claim 12 of the present invention, overcharge is prevented by operating a regenerative resistance when a battery is fully charged with the regenerative energy, so that safe charging can be performed without fail.

According to an aspect of claim 13 of the present invention, since a charging voltage is computed in accordance with a temperature of a secondary battery and control is performed so as to regulate the charging voltage, one hundred percent charging can be performed in a wider range of temperature.

According to an aspect of claim 14 of the present invention, a control means is provided individually for setting rotational velocity of a plurality of wheels and for the control of charging with the regenerative energy, respectively, and also high velocity data communication is performed mutually between those respective control means, so that stable as well as excellent traveling and charging can be performed.

In conventional apparatuses, since a switching control is performed using, for example, signals of an accelerator and a brake when charging regenerative energy, the technology cannot be applied to a system without an accelerator and a brake; however, according to the present invention, those problems can be solved easily.

Specifically, the present invention is a traveling apparatus including a means for independently driving a plurality of wheels, and a chassis connecting the plurality of wheels, in which a means for detecting a barycentric shift of a rider is provided; and the traveling apparatus travels by setting rotational velocity of the plurality of wheels respectively in accordance with information on the detected barycentric shift and further includes a means for detecting the rotational velocity of the plurality of wheels and a control means for performing control of charging with regenerative energy from the means for driving the plurality of wheels when the detected rotational velocity of the wheel is more than the velocity that has been set.

Further, the present invention is a method for controlling a traveling apparatus in which a plurality of wheels are driven independently; the chassis connecting the plurality of wheels is included; and the chassis is provided with a means for detecting the barycentric shift of the rider to travel by setting rotational velocity of the plurality of wheels respectively in accordance with the information on the detected barycentric shift, wherein the rotational velocity of the plurality of wheels is detected and the control is performed to charge with the regenerative energy from the means for driving the plurality of wheels when the detected rotational velocity of the wheel is faster than the velocity that has been set.

BRIEF DESCRIPTION OF THE DRAWINGS

FIG. 6 is a diagram explaining a postural control when a man rides on;

DESCRIPTION OF THE PREFERRED EMBODIMENTS

Figure 1:
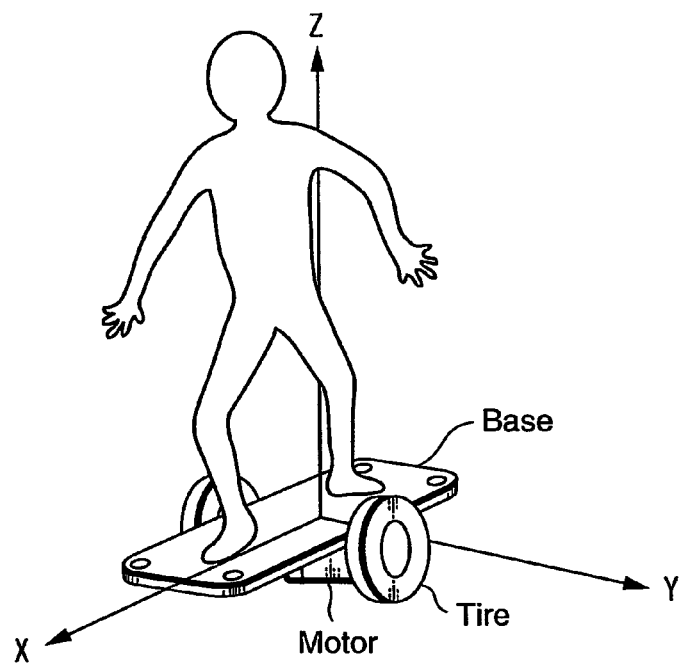
FIG. 1 is a perspective view showing an external appearance of an example of a coaxial two-wheeled vehicle which has previously been proposed by the applicant of the present invention.
Figure 2:
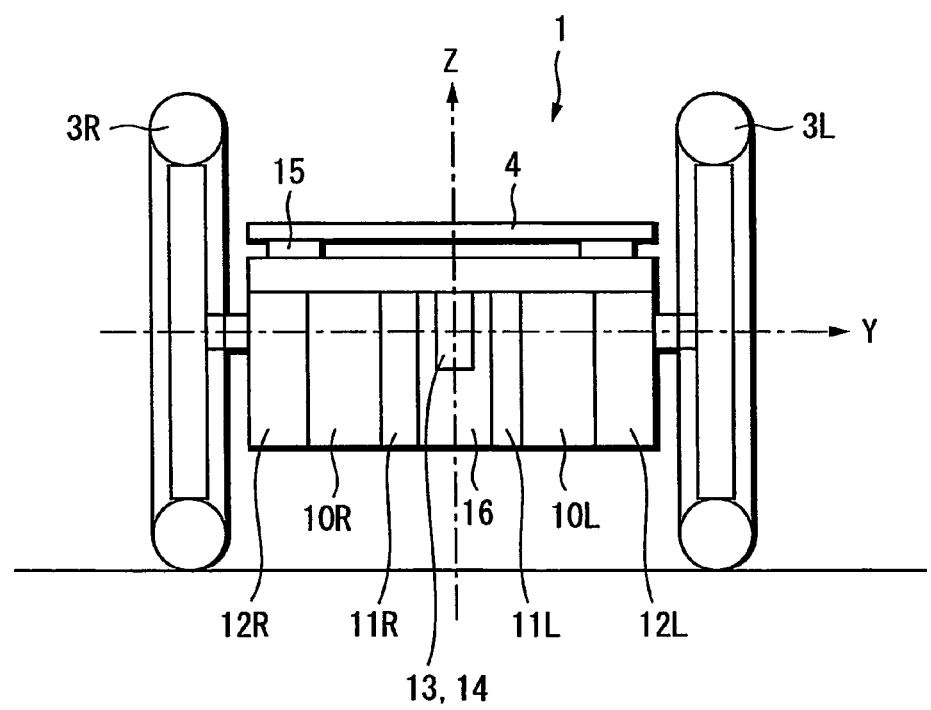
FIG. 2 is a lateral cross-sectional view for explaining a base of a coaxial two-wheeled vehicle.
Figure 3A:
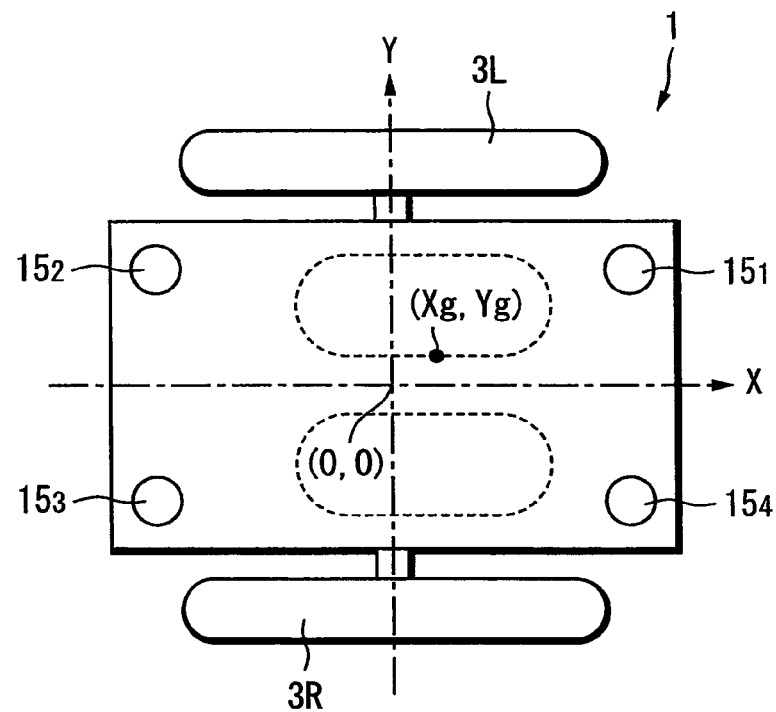
FIGS. 3A and 3B are diagrams showing pressure sensors which are provided in a base of a coaxial two-wheeled vehicle, in which 3A is a plan view and 3B is a lateral view.
Figure 3B:
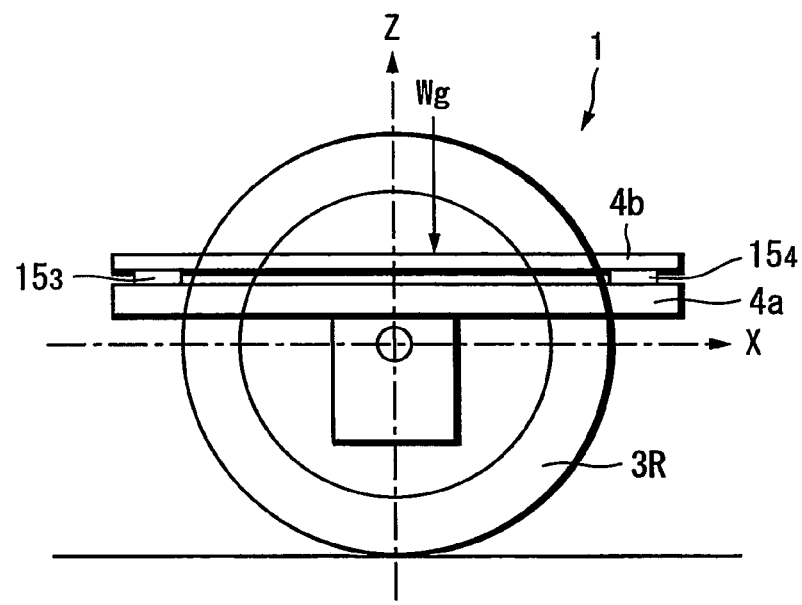
Figure 4:
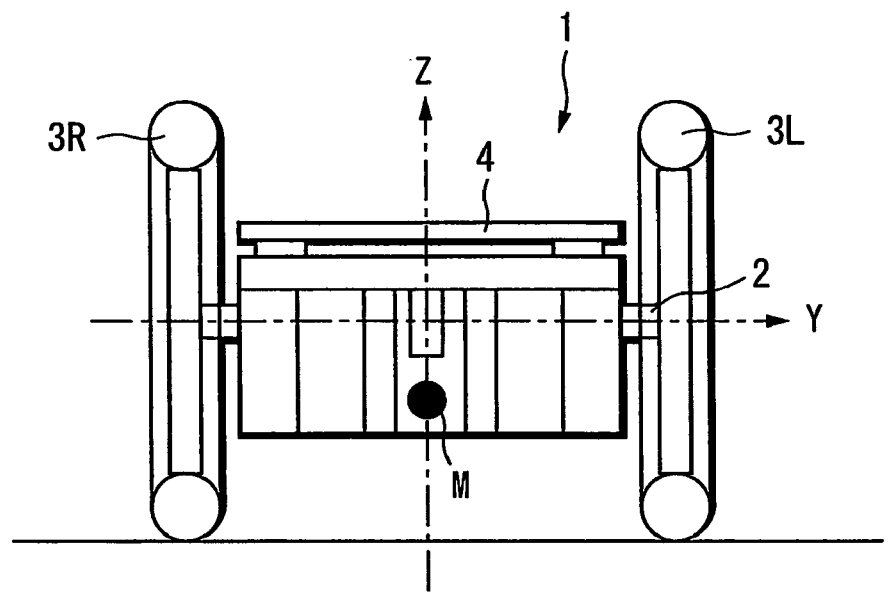
FIG. 4 is a diagram showing a positional relationship between a weight center and an axle of a two-wheeled vehicle.
Figure 5:
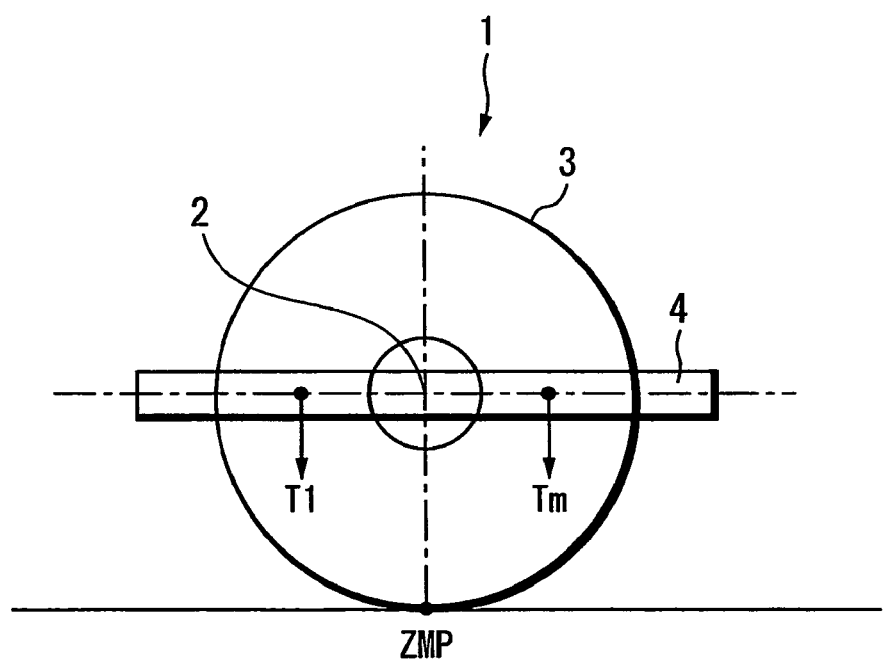
FIG. 5 is a diagram for explaining a balance between a load induced torque and a motor torque.
Figure 6:
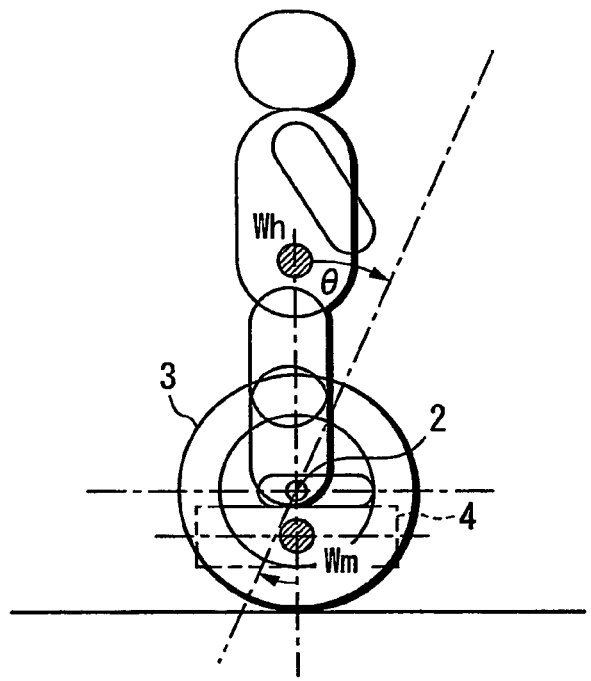
Figure 7:
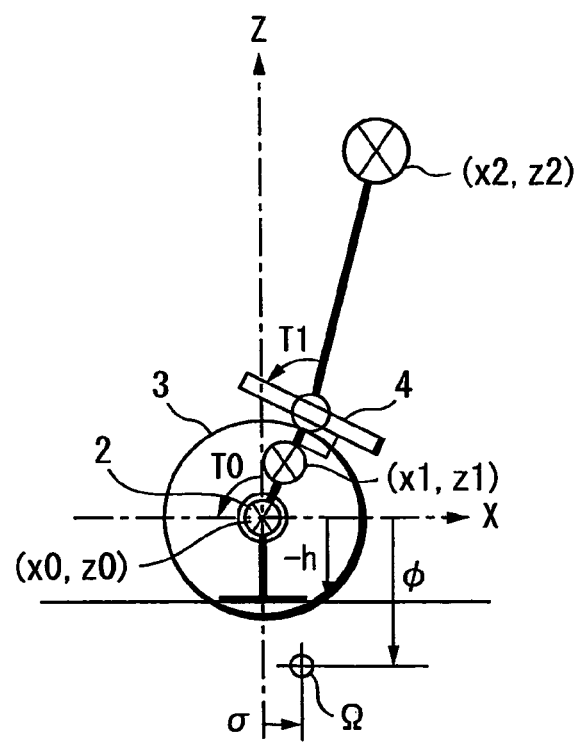
FIG. 7 is a diagram for explaining a dynamic model for maintaining a posture on a base.
Figure 8:
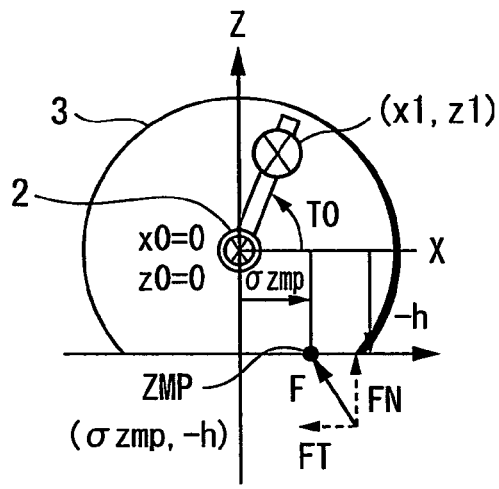
FIG. 8 is a diagram for explaining a dynamic model for maintaining a posture on a base.
Figure 9:
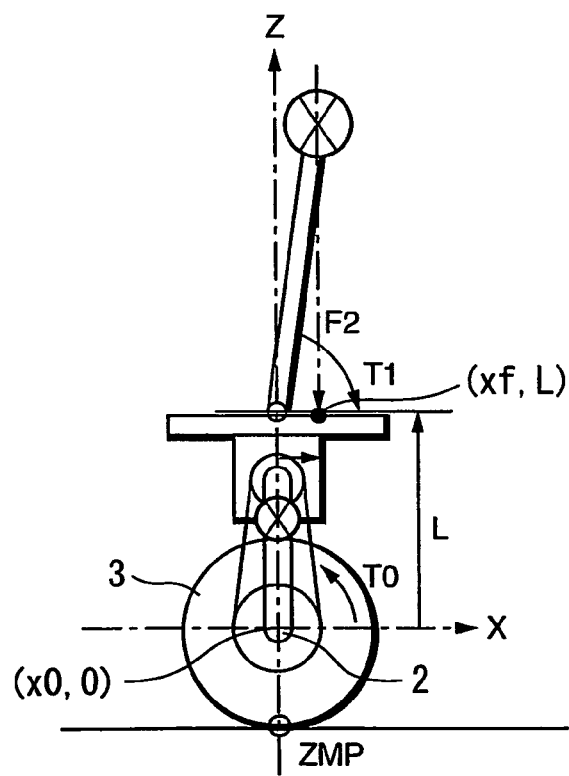
FIG. 9 is a diagram for explaining a dynamic model for maintaining a posture on a base.
Figure 10:
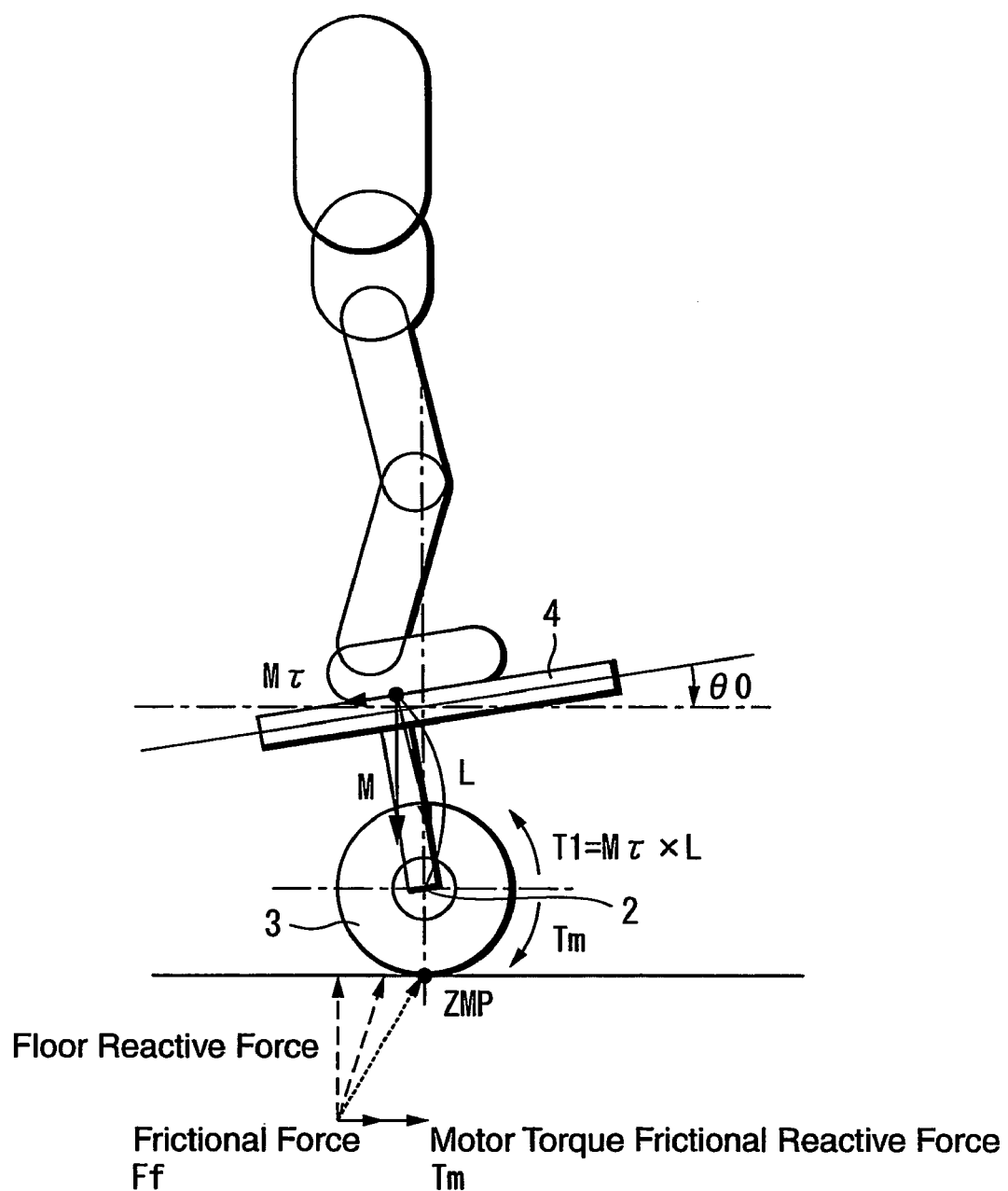
FIG. 10 is a diagram for explaining a dynamic model in a coaxial two-wheeled vehicle.
Figure 11:
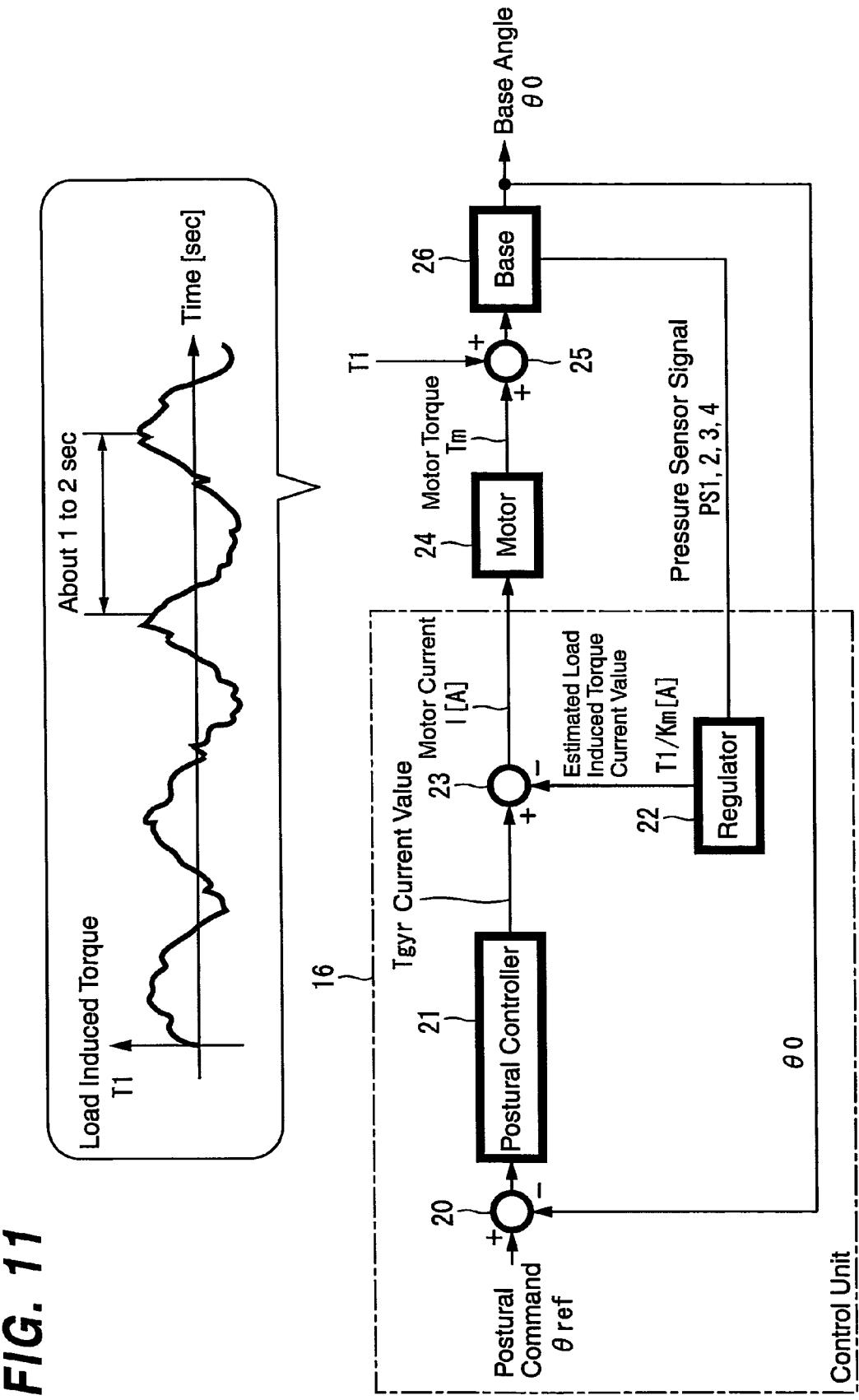
FIG. 11 is a diagram showing a control mechanism for postural stabilization control.
Figure 12:
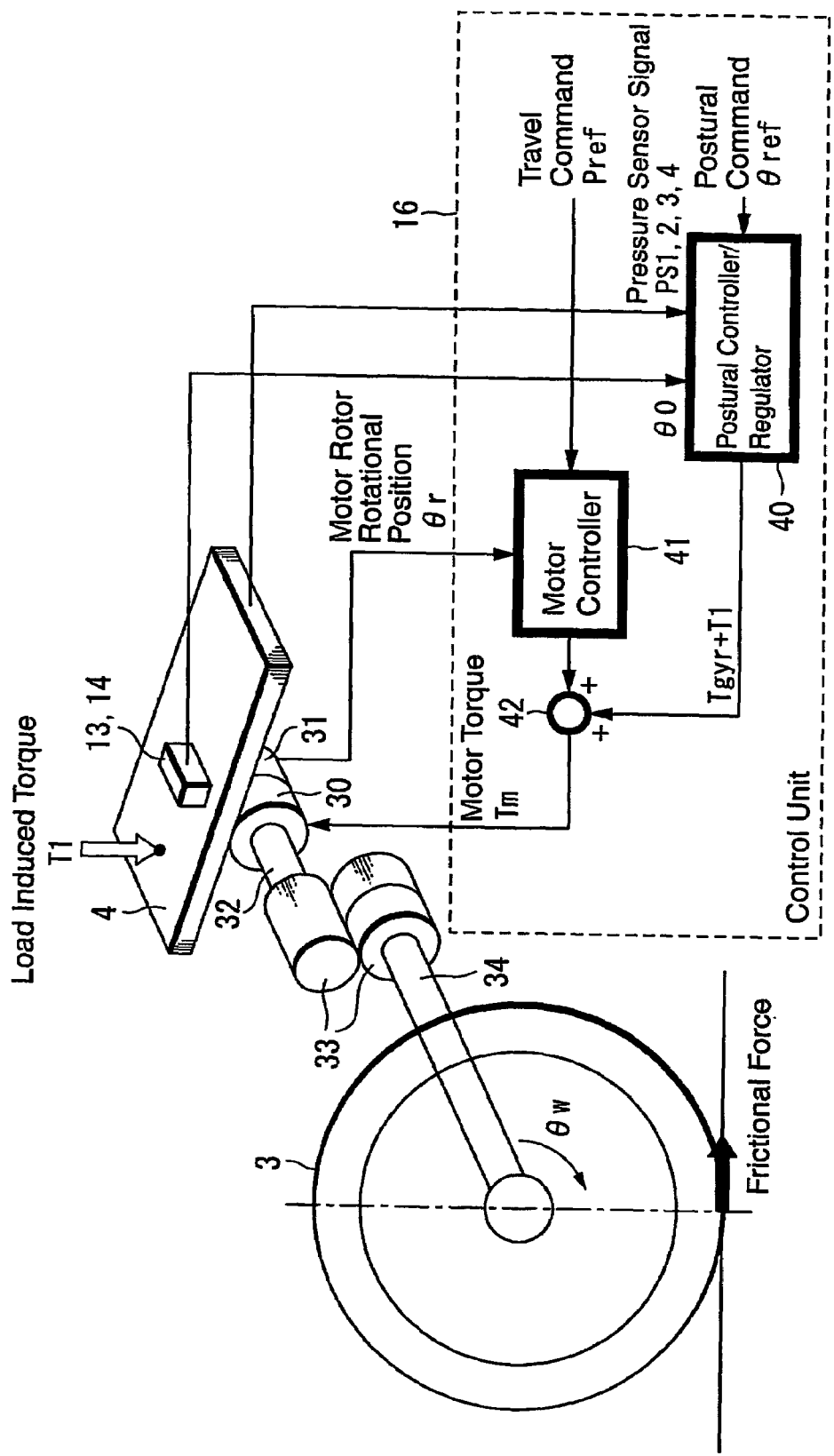
FIG. 12 is a diagram showing a control mechanism for postural stabilization control and traveling control in the case where only one wheel is considered to be provided.
Figure 13:
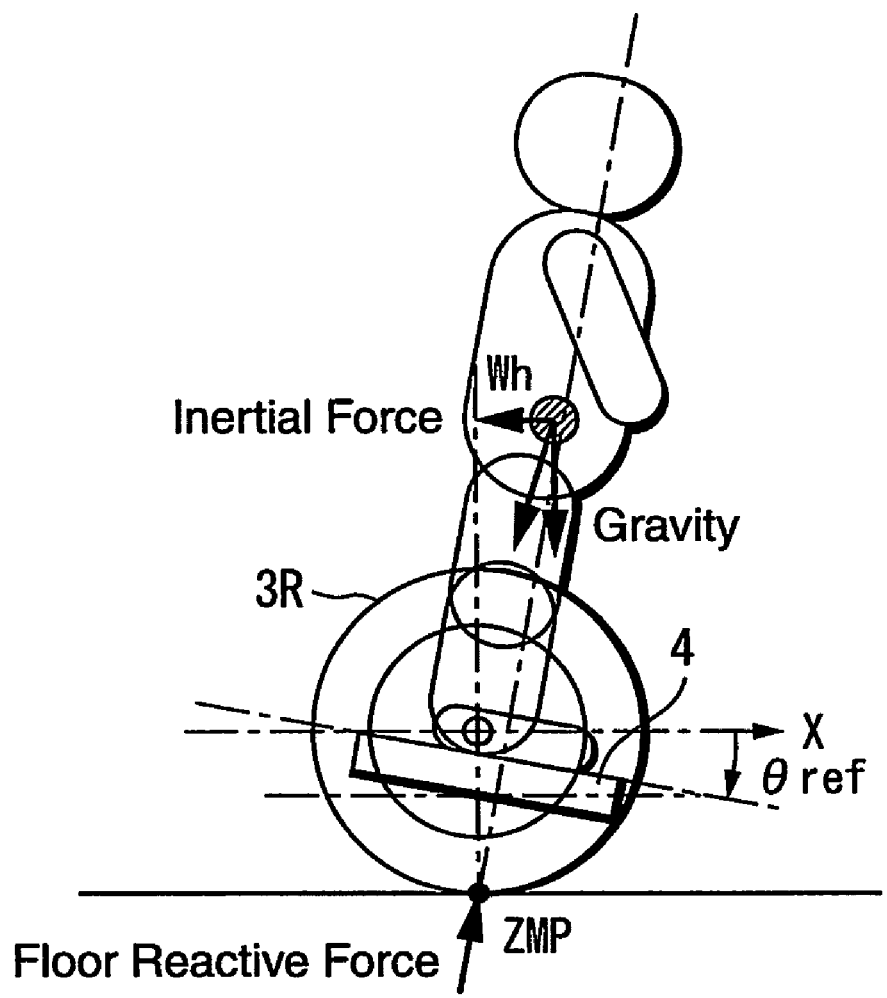
FIG. 13 is a diagram for explaining a postural command in a coaxial two-wheeled vehicle.
Figure 14:
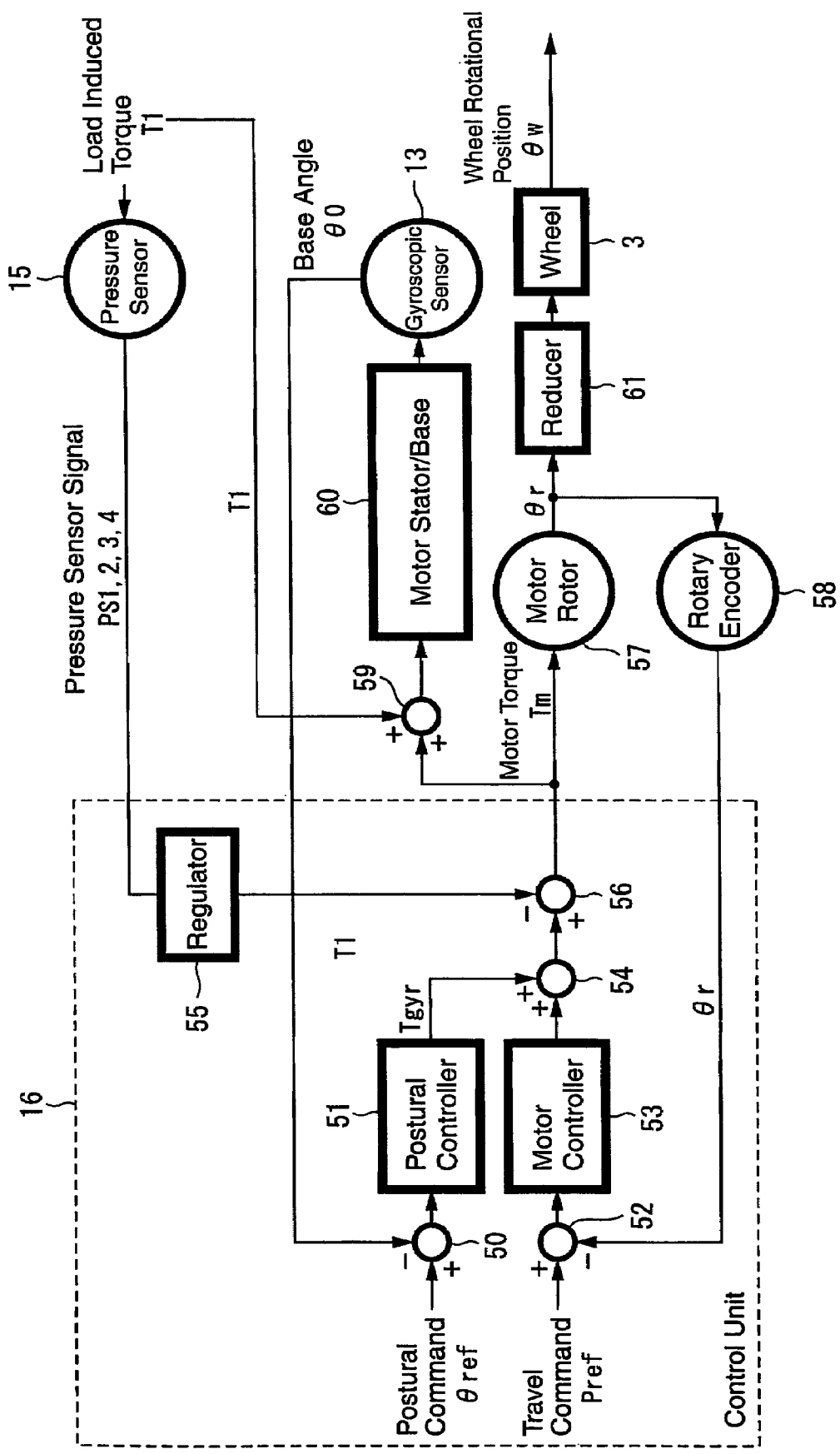
FIG. 14 is a block diagram showing a control mechanism for postural stabilization control and traveling control in the case where only one wheel is considered to be provided.
Figure 15:
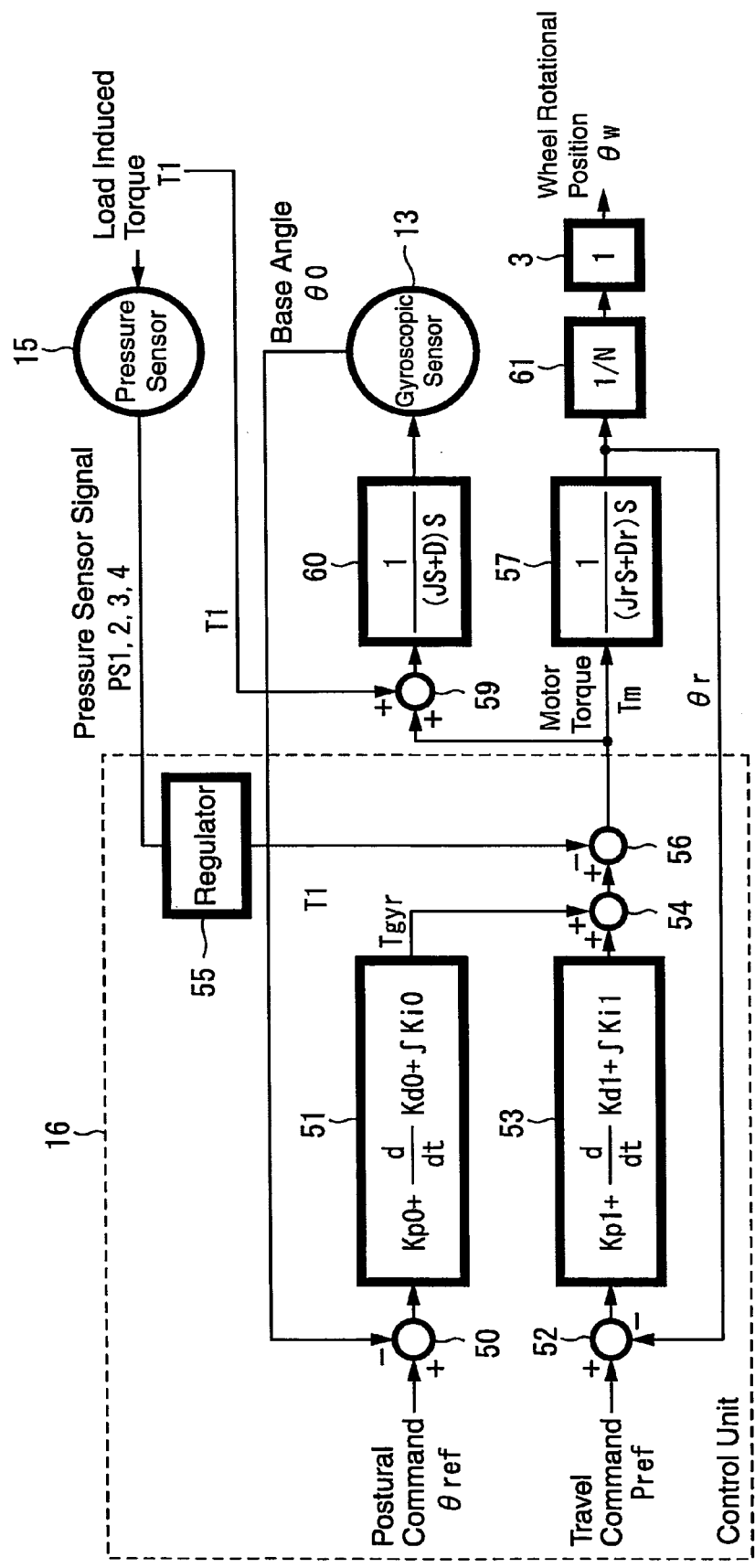
FIG. 15 is a diagram showing the block diagram of FIG. 14 as a mathematical model.
Figure 16:
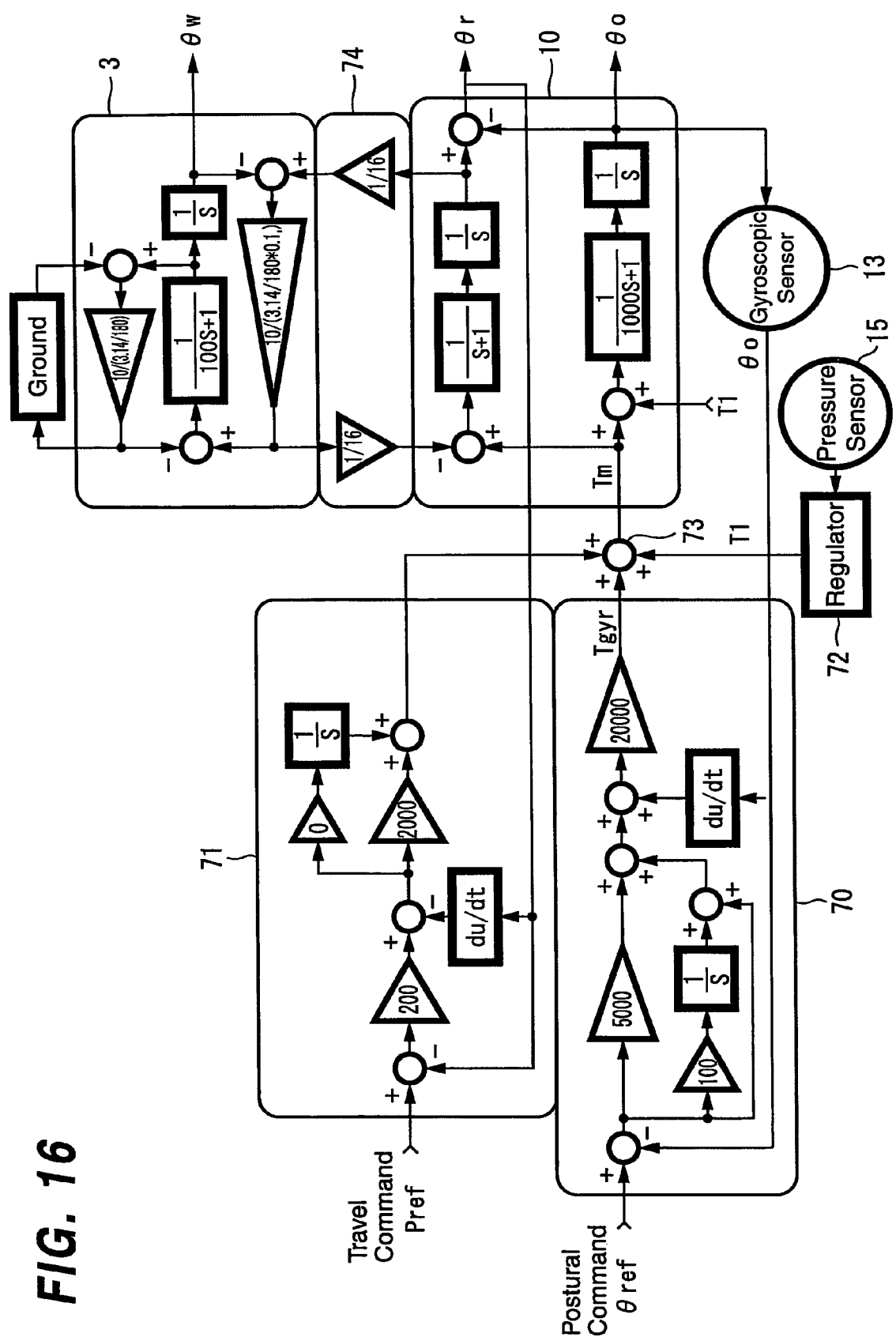
FIG. 16 is a diagram showing in detail a specific example of the mathematical model shown in FIG. 15.
Figure 17:
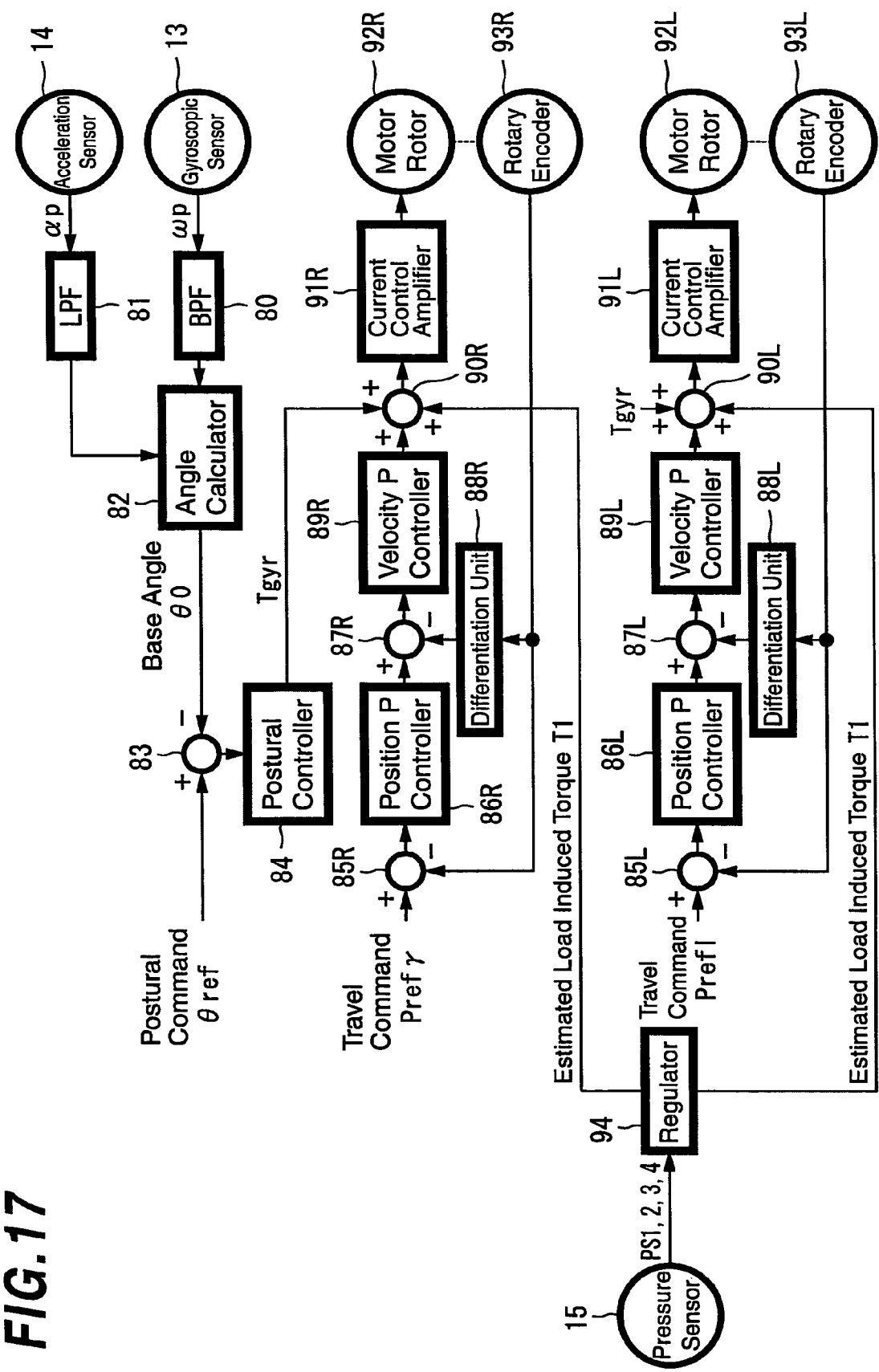
FIG. 17 is a block diagram showing a control mechanism for postural stabilization control and traveling control in the case where two wheels are provided.
Figure 18:
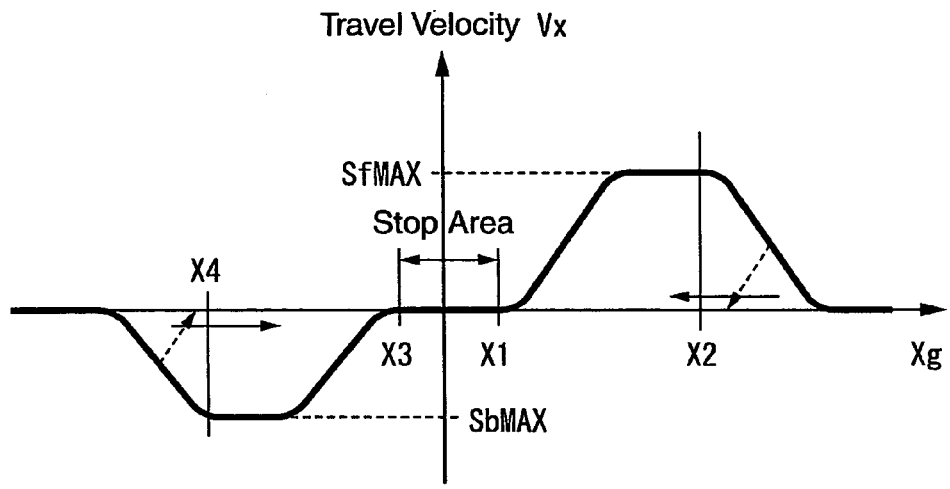
FIG. 18 is a diagram for explaining a travel velocity control in the case of moving forward and moving backward.
Figure 19:
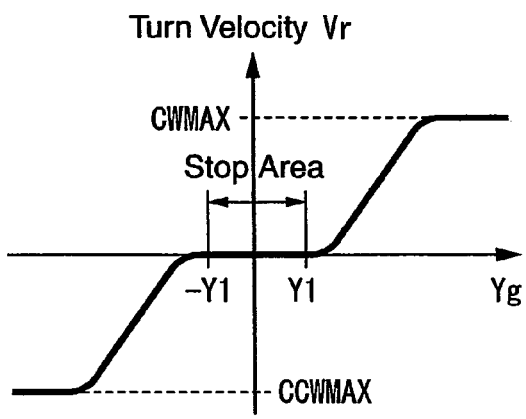
FIG. 19 is a diagram for explaining a travel velocity control in the case of making a turn.
Figure 20:
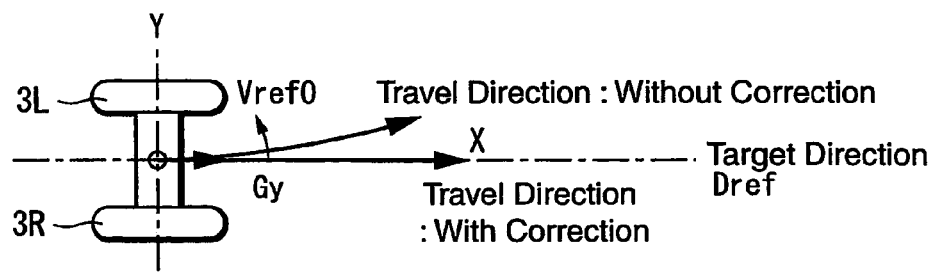
FIG. 20 is a diagram for explaining a control method in the case where a signal of a gyroscopic sensor around a yaw axis is detected when moving straight ahead.
Figures 21A, 21B:
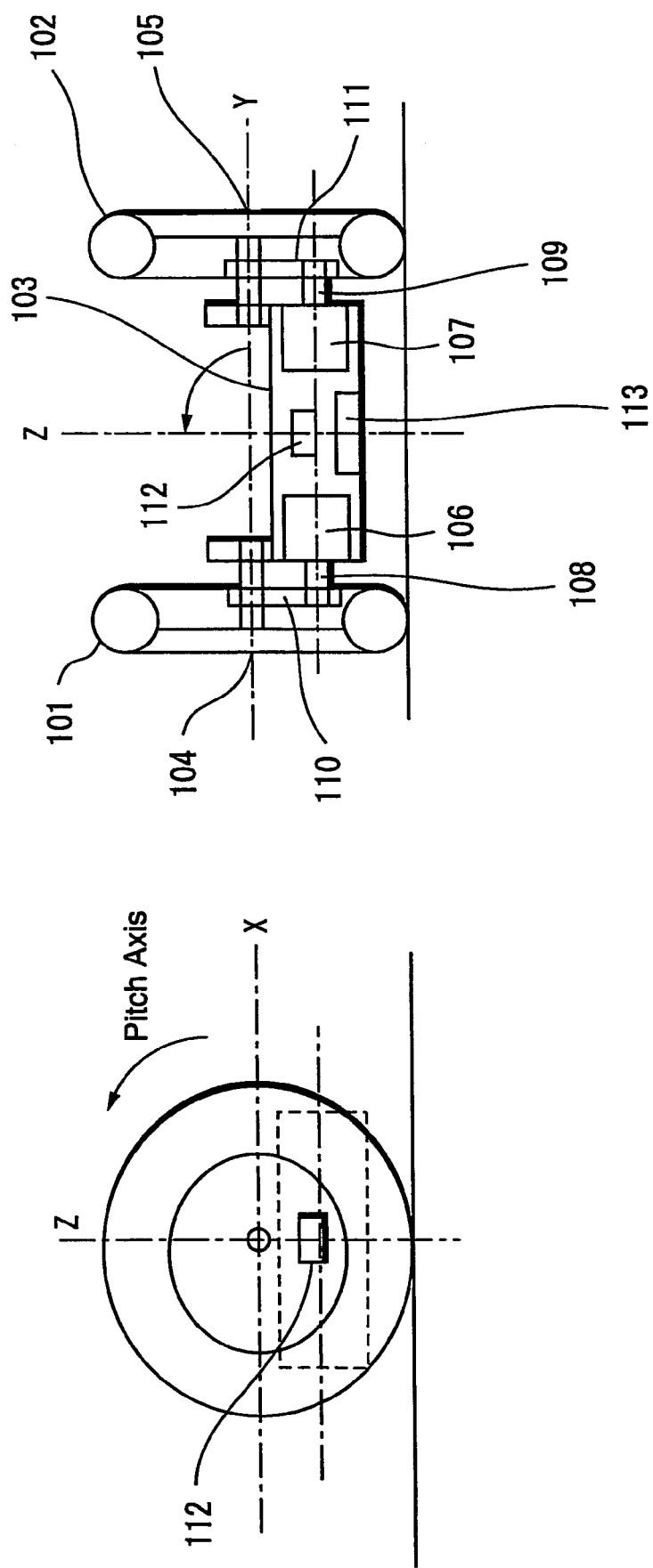
FIGS. 21A and 21B are diagrams showing the construction of an embodiment of a coaxial two-wheeled vehicle to which a traveling apparatus and a method for controlling thereof according to the present invention are applied, in which 3A is a front view A and 3B is a lateral view.

Hereinafter, the present invention is explained referring to accompanied drawings, and FIGS. 21A and 21B are diagrams showing the construction of an embodiment of a coaxial two-wheeled vehicle to which a traveling apparatus and a method for controlling thereof according to the present invention are applied, in which 21A is a front view and 21B is a lateral view.

In FIG. 21, for example, right and left wheels 101 and 102 are provided. Those right and left wheels 101 and 102 are disposed so as to make respective axles 104 and 105 thereof aligned on a straight line by a table (chassis) 103. Further, right and left motors 106 and 107 are disposed close to the axles 101 and 102 respectively in the table 103, and rotary shafts 108 and 109 of those right and left motors 106 and 107 are connected to the axles 104 and 105 respectively through transmission units (reducer) 110 and 111, so that the wheels 101 and 102 are driven to rotate.

Moreover, a sensor circuit 112 such as a gyroscopic sensor for detecting a posture of a rider or an acceleration sensor is mounted on the table 103. Then, a sensor signal which is detected by the sensor circuit 112 is supplied to a control unit 113 to perform a control of driving the motors 106 and 107, to perform a control of a posture of the table 103 with respect to the roll axis and the pitch axis, and also to perform a control of charging a secondary battery 115 (not shown) with regenerative energy by a charging circuit 114 (not shown) installed together with this control unit 113.

Figure 22:
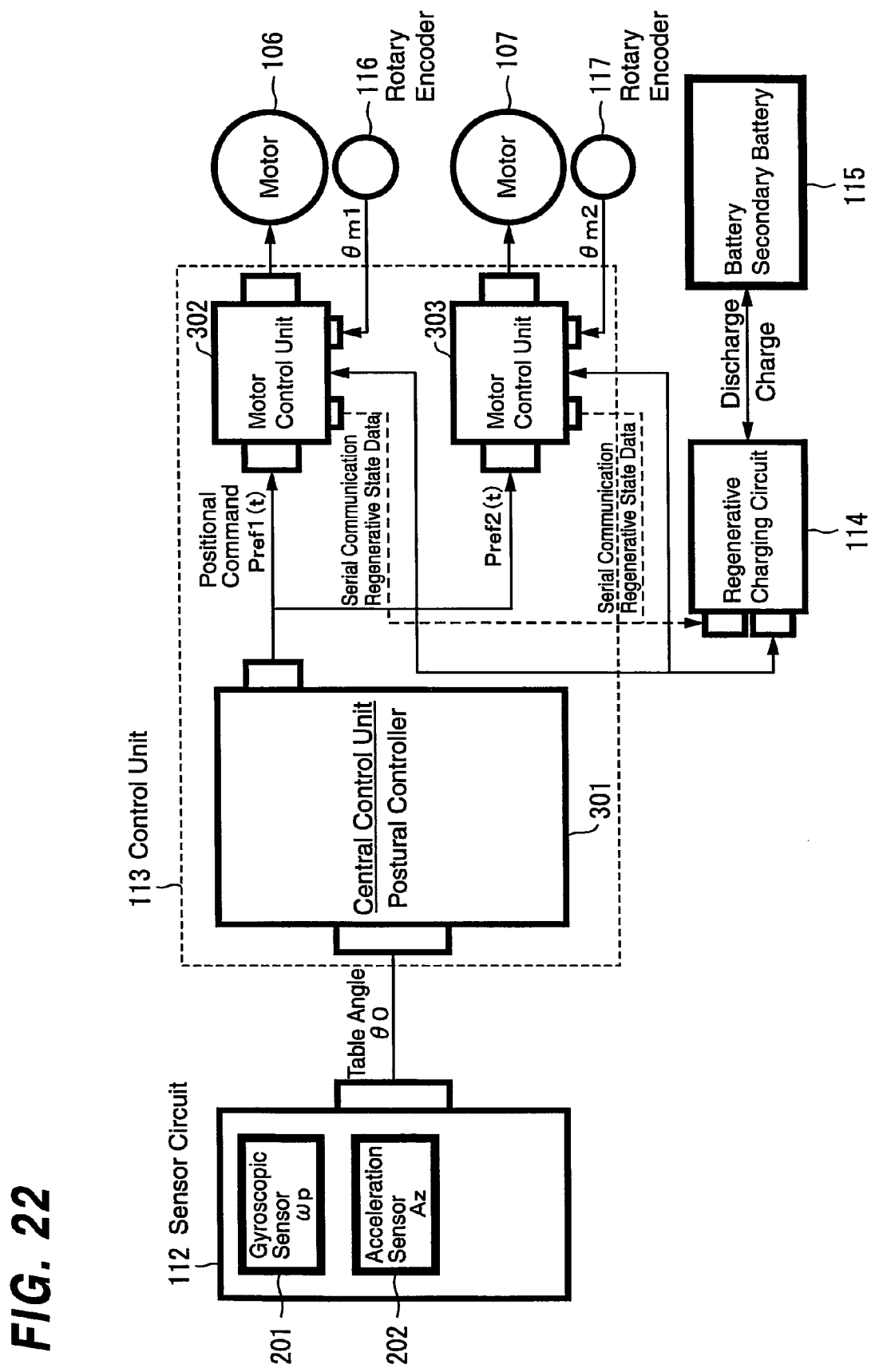
FIG. 22 is a block diagram showing a system configuration of the whole apparatus of an embodiment of the coaxial two-wheeled vehicle to which the traveling apparatus and the method for controlling thereof according to the present invention are applied.

Further, FIG. 22 shows a system configuration of the whole apparatus of an embodiment of the coaxial two-wheeled vehicle to which the traveling apparatus and the method for controlling thereof according to the present invention are applied.

In FIG. 22, an angle $\theta_0$ of the table 103 (not shown) is detected by a sensor signal of a gyroscopic sensor 201 and an acceleration sensor 202 which are included in the above described sensor circuit 112, and the detected signal is supplied to a central control unit (postural control unit) 301 which is included in the above described control unit 113. Then, positional command signals Pref1(t) and Pref2(t) formed in the central control unit 301 are respectively supplied to right and left motor control unit 302 and 303 so as to perform a control for driving the above described right and left motors 106 and 107.

Further, the motors 106 and 107 are respectively provided with rotary encoders 116 and 117. Then, rotational positions $\theta m1$ and $\theta m2$ of the motors 106 and 107 are respectively detected in those rotary encoders 116 and 117, those detected signals are fed back to the motor control units 302 and 303, and a feed-back control is performed so that the rotational positions $\theta m1$ and $\theta m2$ of the motors 106 and 107 comply with the positional command signals Pref1(t) and Pref2(t) which are formed in the central control unit 301, respectively.

Further, a regenerating state is also detected in the motor control units 302 and 303 by comparing the rotational positions $\theta m1$ and $\theta m2$ with the positional command signals Pref1(t) and Pref2(t). That is, in the motor control units 302 and 303, the rotational velocity set to respective wheels is learned from the positional command signals Pref1(t) and Pref2(t), and also actual rotational velocity of the wheels is learned from the rotational positions $\theta m1$ and $\theta m2$. Then, it can be judged that regenerative energy is generated, when the detected rotational velocity of the wheel is faster than the velocity that has been set.

Then, those data of the regenerative state are respectively transmitted to the regenerative charging circuit 114 by serial communication to perform a control of charging and discharging the secondary battery 115. In other words, in the state where the regenerative energy is not generated, electrical power charged in the secondary battery 115 is discharged to be supplied to the motor control units 302 and 303 to drive the motors 106 and 107. Further, in the state where the regenerative energy is generated, control is performed in which the regenerative energy generated in the motors 106 and 107 is taken out from the motor control units 302 and 303 to charge the secondary battery 115.

Therefore, according to this embodiment, rotational velocity of the wheel is set, and when the rotational velocity of the wheel is detected and the detected velocity is faster than the velocity that has been set, the control for charging with the regenerative electrical power is performed, so that it is possible to perform very efficient charging with the regenerative electrical power.

Accordingly, in a conventional apparatus, since the charging with regenerative energy is performed by a switching control using signals of, for example, an accelerator and a brake, it has not been possible to apply this technology to a system without an accelerator and a brake; however, according to the present invention those problems can be solved easily.

Specifically, according to the above described embodiment, since a switching control is not performed using a signal of an accelerator or a brake, the present invention can be applied to a system such as a coaxial two-wheeled vehicle without an accelerator or a brake. Moreover, comparing with a method in which a terminal voltage of a motor for example is judged and when it becomes higher than an applied voltage, it is judged that regenerative energy is generated to switch into charging, a response speed can be faster in the present invention so that it is possible to realize efficient charging.

Figure 23:
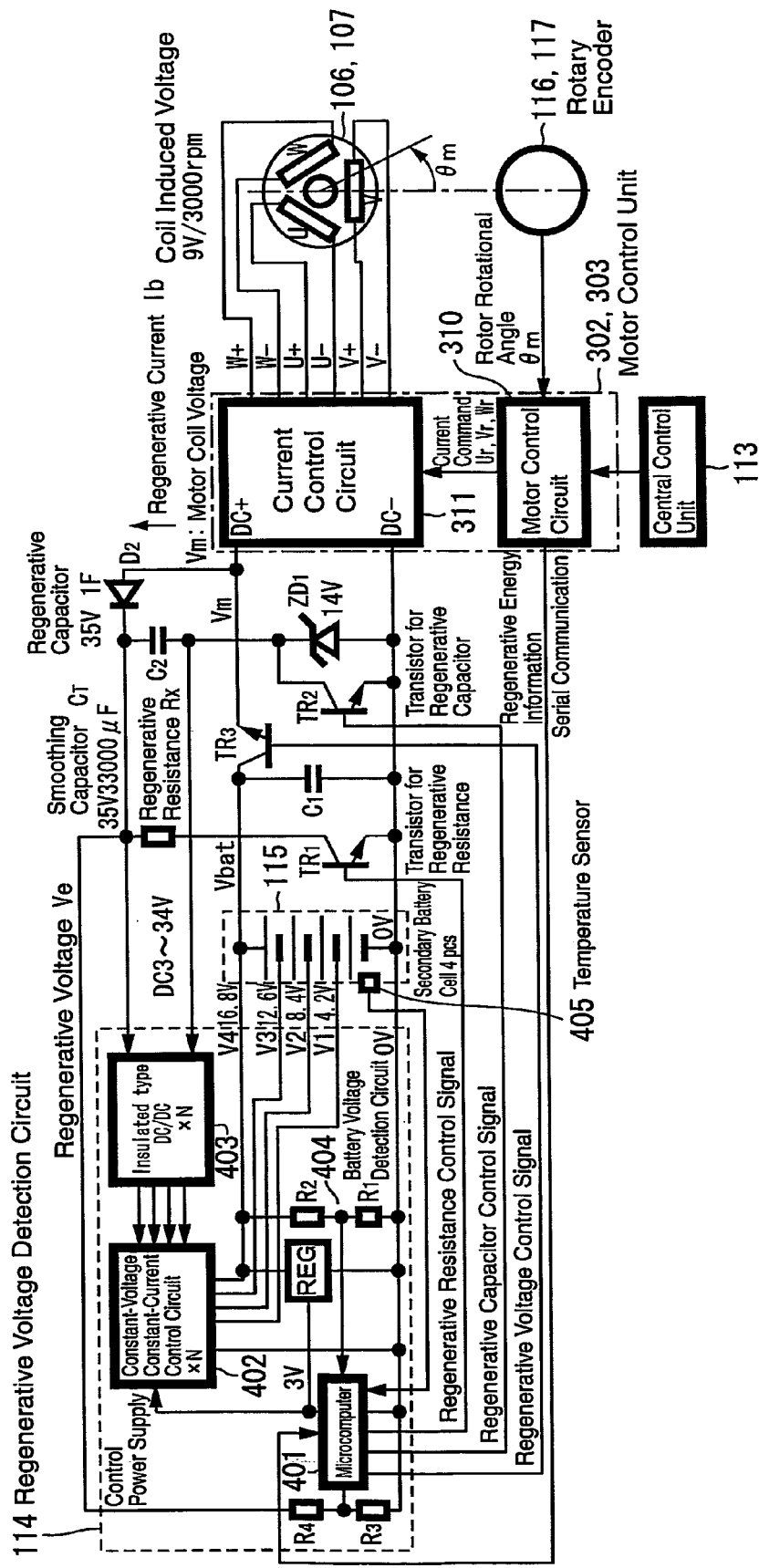
FIG. 23 is a diagram showing a specific circuit connection of a regenerative charging circuit and peripheral circuits thereof.

Further, FIG. 23 shows a specific circuit connection diagram of a regenerative charging circuit and peripheral circuits thereof. In FIG. 23, the regenerative charging circuit 114 includes a microcomputer 401, a constant-voltage and constant-current control circuit 402 and a plurality of insulated type DC/DC converters 403. Moreover, the secondary battery 115 includes a plurality of cells which are connected in series. The plurality of those cells have a charging voltage of, for example, 4.2 volts, respectively.

Hereupon, with providing the same number of insulated type DC/DC converters 403 described above as the number of cells included in the secondary battery 115 to supply a charging voltage to each cell, the charging circuit can be operated at a low voltage. In other words, though 16.8 V is required when the number of cells is four for example, a voltage of individual cell becomes 4.2 V with this construction and therefore, it becomes possible to operate the circuit even if the regenerative voltage is low.

Moreover, a motor control circuit 310 and a current control circuit 311 which are made of a microcomputer are provided in the motor control units 302 and 303. Then, the rotational velocity of the motors 106 and 107 which are detected by the rotary encoders 116 and 117 is supplied to the motor control circuit 310, difference from the rotational velocity set by the central control unit 113 is obtained, and the motors 106 and 107 are controlled to be driven by the current control circuit 311 in the direction to correct the difference.

The microcomputer of the motor control circuit 310 also has a circuit by which a chargeable state of regenerative energy due to a deceleration of the motors 106 and 107 can be transmitted using serial communication to the microcomputer 401 in the regenerative charging circuit 114. Further, after receiving the above described motor information according to the serial communication, the microcomputer 401 of the charging circuit 114 controls a transistor or the like described later on such that the regenerative energy accumulates in a capacitor $C_2$.

That is, the motor control circuit 310 incorporates a unit which performs a feed-back control of a velocity by taking in outputs of the rotary encoders 116 and 117 which are mounted in the motors 106 and 107; inputs a velocity command signal generated from the central control unit 113 and an actual motor velocity signal; detects a regenerative energy state in which mechanical energy is converted into electrical energy when the actual velocity is faster than the velocity command; and transmits information thereon to the microcomputer 401 of the charging circuit 114 as communication data.

Further, after receiving the communication data of the regenerative state which is transmitted from the motor control circuit 310, the microcomputer 401 of the charging circuit 114 accumulates the regenerative energy in the capacitor $C_2$. The electrical energy accumulated in the capacitor $C_2$ is converted by the DC/DC converter 403 into the charging voltage to charge the secondary battery 115. Explanation in detail will further be given in the following.

Figure 24:
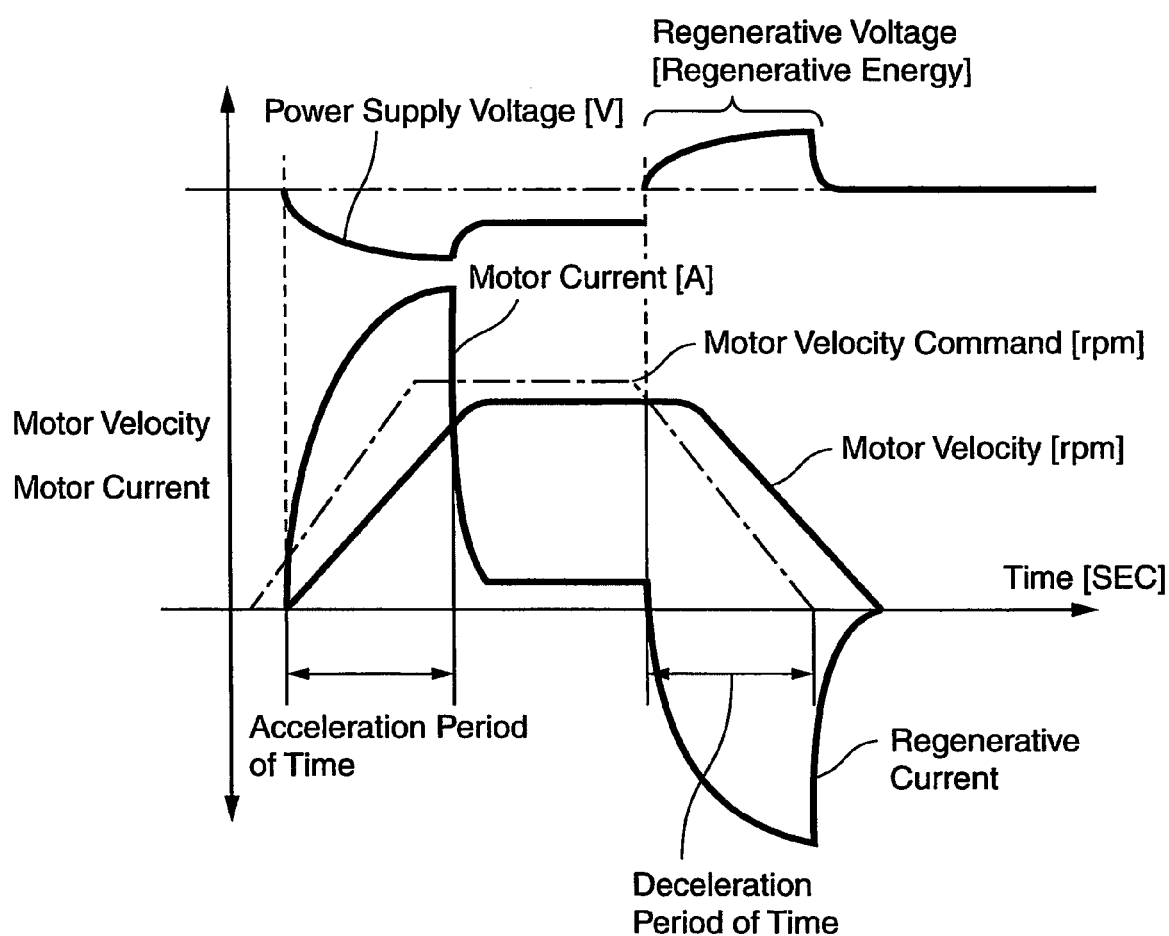
FIG. 24 is a diagram for explaining FIG. 23.

Hereupon, when the motors 106 and 107 decelerate, the mechanical energy is converted into the electrical energy by a power generation operation. For example, as shown in FIG. 24, the shorter deceleration time is, the larger the mechanical energy becomes and therefore, the larger regenerative current flows. The mechanical energy J is proportional to a mass m [kg] of a vehicle viewing from a motor rotor and the amount of deceleration D [m/sec$^2$].

$J=K_0 \times m \times D$ [j], wherein $K_0$ is a positive constant determined by a motor.

Furthermore, the mechanical energy J is converted into the electrical energy (regenerative voltage and regenerative current) by the motors 106 and 107. The regenerative electrical power obtained in this manner is accumulated in the capacitor $C_2$ to charge the secondary battery 115 with a power supply which is controlled to be a constant voltage using the DC/DC converter 403. Moreover, since the mechanical energy is consumed when the motors 106 and 107 accelerate, energy of the secondary battery 115 is discharged and a voltage falls with a flow of current as shown in FIG. 24.

Since the mechanical energy is thus converted into the electrical energy when the motors 106 and 107 decelerate, a motor coil voltage becomes higher than an applied voltage. This regenerative voltage is accumulated in the regenerative capacitor $C_2$ to charge the secondary battery 115 with this electrical energy. Specifically, this embodiment is characterized in that a control is performed by the circuit so as to accumulate a deceleration period of the motors 106 and 107 as charging energy in the capacitor $C_2$.

Moreover, the microcomputer 401 observes simultaneously a voltage Vbat of the secondary battery 115 and a motor coil power supply Vm. Therefore, the microcomputer 401 turns off a transistor $TR_2$ and accumulates energy having a voltage equal to or more than a voltage of a zener diode $ZD_1$, which is set to the same voltage as the secondary battery 115, in the capacitor $C_2$ when the voltage becomes equal to or larger than the secondary battery voltage due to a counter electromotive voltage generated by the motors 106 and 107 which are rotated by an external force or due to regenerative electrical power which is generated during a deceleration period.

Further, when the secondary battery 115 is in the state of discharging and the voltage becomes low, the microcomputer 401 turns on the transistor $Tr_2$ to charge the capacitor $C_2$ even if an electromotive voltage is low, which is generated while the motors 106 and 107 are rotated at a low speed revolution. Thus, the regenerative energy can be accumulated continuously in the capacitor $C_2$. In other words, since the mechanical energy can be always converted into the electrical energy to be accumulated, the secondary battery 115 can be charged.

On the other hand, when a vehicle goes down a downward slope in a state where the secondary battery 115 may be fully charged, there arises a risk of damaging a circuit due to an increase of a motor coil voltage when the mechanical energy becomes large enough and impossible to be charged. In order to solve the problem, the microcomputer 401 performs control in which the transistor $TR_1$ is turned on in a non-chargeable state and energy is discharged through a heat using a regenerative resistance Rx.

Specifically, the incorporated microcomputer 401 observes a charging state of the secondary battery 115 with a battery voltage detection circuit 404 including resistors R1 and R2, and in case of a fully charged state and also when the regenerative voltage becomes high, the transistor $TR_1$ is turned on to discharge through the regenerative resistance Rx. Moreover, the microcomputer computes an optimal charging voltage with a temperature sensor 405 attached to a cell of the secondary battery 115 to charge with a charging voltage in accordance with a temperature, so that one hundred percent charging can be obtained even if the temperature varies.

Furthermore, the motor control circuit 310 includes a unit driven by a feed-back control to make the difference become zero after comparing a motor rotation command from the higher rank central control unit 113 with a signal from the rotary encoders 116 and 117 which are mounted on the rotor.

In this unit, a rotational velocity command is computed based on a rotational angle command from a higher rank command. In the motor control circuit 310, when an actual motor velocity is lower in comparison to the velocity command, a state is observed in which the energy is discharged from the battery.

On the contrary, when the actual motor velocity is higher in comparison to the velocity command, the mechanical energy is supplied to the motors 106 and 107 from the external force to rotate, and the regenerative voltage is generated from the motors 106 and 107 to be in the state in which the electrical energy charges, the capacitor $C_2$. Thus, the state of the regenerative energy of the motors 106 and 107 can be detected. The state thus detected, in which charging is performed with the regenerative energy, is transmitted to the microcomputer 401 in the regenerative charging circuit 114 by the serial communication.

Accordingly, the microcomputer 401 turns on a transistor $TR_2$ to accumulate the regenerative energy in the regenerative capacitor $C_2$ and turns off a transistor $TR_3$. Then, when the motors 106 and 107 again consume the energy due to acceleration, the transistor $Tr_2$ is turned off and the transistor $TR_3$ is turned on. Thus, with respect to the energy consumption state of the motors 106 and 107, the energy of the secondary battery 115 is used and the regenerative electrical power is accumulated in the capacitor $C_2$ when the regenerative energy exists, so that the consumption of the battery (secondary battery 115) can be reduced.

Individual cells of the secondary battery 115 are charged with the regenerative energy thus accumulated by the DC/DC converter 403. Thus, since charging is performed at a low voltage, the charging can be performed even if the regenerative energy is not large.

Furthermore, in the state where the secondary battery 115 is fully charged and the regenerative capacitor C2 is also charged when the vehicle goes down a downward slope, the microcomputer 401 of the charging circuit 114 turns on the transistor $TR_1$ to discharge the regenerative energy through the heat by the regenerative resistance Rx. Accordingly, even in the state where the secondary battery is fully charged, voltage is controlled using the regenerative resistance Rx to prevent overcharging.

Accordingly, in the prior art, it has been necessary to raise a voltage by a DC/DC converter in order to charge since an induced voltage is low at a low speed rotation, and on the other hand, it has been necessary to lower the voltage since the induced voltage becomes high at a high speed rotation; and due to this reason, it has been necessary to design the DC/DC converter to allow a large fluctuation range of input voltage. However, according to the above described embodiment, a circuit is provided with which the secondary battery can be charged efficiently with the regenerative energy over a range from the low speed rotation to the high speed rotation.

Moreover, a conventional regenerative charging circuit for a vehicle performs a control of charging with regenerative electrical power using an accelerator signal and a brake signal and has not been possible to be applied to a system without an accelerator signal and a brake signal such as, for example, a two-wheeled traveling vehicle; however, according to the above described embodiment, since information on the rotation by the external force is detected by the microcomputer of the motor control circuit, this information is transmitted to the charging circuit to enable the charging to be performed.

Further, the electrical energy, in which mechanical energy generated from making a rotor rotated in a motor by an external force from the outside is converted into an induced voltage of a motor coil by the motor, is accumulated in a capacitor, and a secondary battery can be charged with the accumulated electrical energy; and even if the induced voltage is low at that time, the secondary battery has a structure including a plurality of battery cells, so that each cell can be charged although a charging voltage is low.

Figure 25:
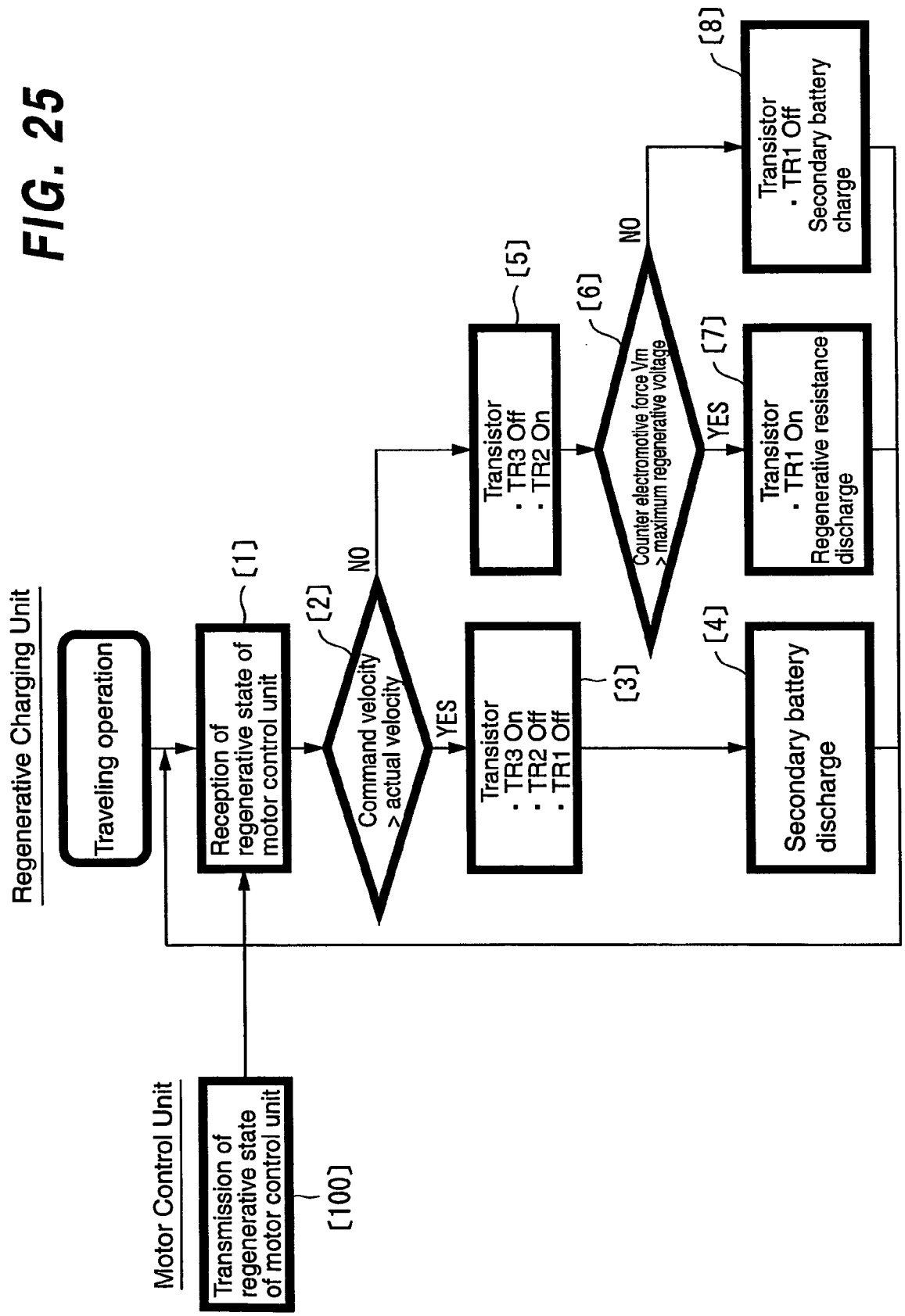
FIG. 25 is a flow chart for explaining an operation thereof.

Furthermore, FIG. 25 shows a flow chart of controlling a transistor of a regenerative charging circuit by a microcomputer which performs the above described operation. In FIG. 25, in the state where a traveling operation is performed, data on a regenerative state is transmitted from the motor control units 302 and 303 at a step [100]. Then, the data on the regenerative state is received at a step [1]. Further, it is judged whether or not |command velocity|>|actual velocity| at a step [2].

Then, when the judgment is YES at the step [2], the transistor $TR_3$ is turned on, $TR_2$ is turned off and $TR_1$ is turned off at a step [3], and the secondary battery discharges at a step [4]. Further, the operation is repeated after returning to the step [1].

On the other hand, when the judgment is NO at the step [2], the transistor $TR_3$ is turned off and $Tr_2$ is turned on at a step [5]. Further, it is judged whether or not |counter electromotive force Vm|>|maximum regenerative voltage| at a step [6].

Then, when the judgment is YES at the step [6], the transistor $TR_1$ is turned on at a step [7] to perform a regenerative resistance discharge, and when the judgment is NO at the step [6], the transistor $TR_1$ is turned off at a step [8] to charge the secondary battery. Further, the operation is repeated after returning to the step [1]. In this manner, the control of transistors in the regenerative charging circuit is performed.

Accordingly, the above described traveling apparatus has a means for independently driving a plurality of wheels and a chassis connecting the plurality of wheels, in which the chassis is provided with a means for detecting a barycentric shift of a rider so as to perform traveling by respectively setting rotational velocity of the plurality of wheels in accordance with information on the detected barycentric shift described above; and the apparatus further includes a means for detecting the rotational velocity of the plurality of wheels and a control means for performing charging with regenerative energy from the means for driving the plurality of wheels when the detected rotational velocity of the wheel is faster than the velocity that has been set, so that extremely efficient charging with regenerative electrical power can be performed.

Further, the method for controlling the above described traveling apparatus is the method for controlling the traveling apparatus which drives independently a plurality of wheels and has the chassis connecting the plurality of wheels and in which the chassis is provided with the means for detecting the barycentric shift of a rider so as to perform traveling by respectively setting rotational velocity of the plurality of wheels in accordance with the information on the detected barycentric shift; and in the method, the rotational velocity of the plurality of wheels is detected to perform control of charging with the regenerative electrical power from the means for driving the plurality of wheels when the detected rotational velocity of the wheel is faster than the velocity that has been set, so that extremely efficient charging with regenerative electrical power can be performed.

In addition, the present invention can also be applied to an apparatus that is a vehicle having its barycenter under the axis of wheels and performing an autonomous traveling, in which a man rides on a vehicle which stabilizes autonomously a vehicle body by a postural control unit to feed back a postural sensor signal and makes the vehicle move forward, move backward and make a turn by changing the barycenter of his/her weight, and be applied to an apparatus of a bipedal autonomous robot of an ambulatory vehicle without mechanism of either a brake or an accelerator or a robot.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A traveling apparatus comprising means for driving a plurality of wheels independently and a chassis connecting said plurality of wheels, in which means for detecting a barycentric shift of a rider is provided in said chassis to perform traveling by respectively setting rotational velocity of said plurality of wheels in accordance with information on said detected shift of the barycenter, further comprising:
   means for detecting the rotational velocity of said plurality of wheels, and
   control means for performing control of charging with regenerative energy from said means for driving the plurality of wheels, when said detected rotational velocity of the wheel is faster than said set rotational velocity of the wheel.

2. The traveling apparatus according to claim 1, wherein said plurality of wheels includes two wheels whose rotational axes are disposed on a straight line and keeping said chassis horizontal is included as an element in setting the rotational velocity of said plurality of wheels.

3. The traveling apparatus according to claim 1, wherein charging with said regenerative energy is performed with respect to a chargeable battery in which a plurality of secondary battery cells are connected in series, a charging terminal is provided for each of said secondary battery cells, and when an amount of said regenerative energy is not large, said control means performs control of selecting an arbitrary cell in said secondary battery to charge said charging terminal.

4. The traveling apparatus according to claim 1, wherein charging with said regenerative energy is performed by either raising or lowering a voltage generated from the regenerative energy to a predetermined charging voltage.

5. The traveling apparatus according to claim 1, further comprising:
   an incorporated safety protecting circuit that prevents overcharge by operating a regenerative resistance, when fully charged with said regenerative energy.

6. The traveling apparatus according to claim 3, wherein a temperature sensor is provided and said control means performs control for regulating a charging voltage by computing the charging voltage in accordance with the temperature of said secondary battery.

7. The traveling apparatus according to claim 1, wherein setting rotational velocity of said plurality of wheels and control for charging with said regenerative energy are respectively performed by providing individual control means; and high velocity data communication is mutually performed between those individual control means.

8. A method for controlling a traveling apparatus which drives a plurality of wheels independently and has a chassis connecting said plurality of wheels, in which said chassis is provided with means for detecting barycentric shift of a rider to perform traveling by respectively setting rotational velocity of said plurality of wheels in accordance with information on said detected barycentric shift, comprising:
   detecting the rotational velocity of said plurality of wheels, and performing control of charging with the regenerative electrical power from said means for driving the plurality of wheels, when said detected rotational velocity of the wheel is faster than said set rotational velocity of the wheel.

9. The method for controlling the traveling apparatus according to claim 8, wherein said plurality of wheels includes two wheels whose rotational axes are disposed on a straight line and keeping said chassis horizontal is included as an element in setting the rotational velocity of said plurality of wheels.

10. The method for controlling the traveling apparatus according to claim 8, wherein charging with said regenerative energy is performed with respect to a chargeable battery in which a plurality of secondary battery cells are connected in series, a charging terminal is provided for each of said secondary battery cells, and when an amount of said regenerative energy is not large, control of selecting an arbitrary cell of said secondary battery to charge said charging terminal is performed.

11. The method for controlling the traveling apparatus according to claim 8, wherein charging with said regenerative energy is performed by either raising or lowering a voltage generated from the regenerative energy to a predetermined charging voltage.

12. The method for controlling the traveling apparatus according to claim 8, wherein regenerative resistance is operated to prevent overcharge, when fully charged with said regenerative energy.

13. The method for controlling the traveling apparatus according to claim 10, wherein control for regulating a charging voltage by computing the charging voltage in accordance with temperature of said secondary battery is performed.

14. The method for controlling the traveling apparatus according to claim 8, wherein setting rotational velocity of said plurality of wheels and control for charging with said regenerative energy are respectively performed by providing individual control means; and high velocity data communication is mutually performed between those individual control means.

15. The method for controlling the traveling apparatus according to claim 8, further comprising:
   comparing said detected rotational velocity of the wheel and said set rotational velocity of the wheel.

16. The traveling apparatus according to claim 1, further comprising:
   a comparator configured to compare said detected rotational velocity of the wheel and said set rotational velocity of the wheel.

17. A traveling apparatus comprising:
   a motor configured to drive a plurality of wheels independently;
   a chassis connecting said plurality of wheels;
   a barycentric shift detector configured to detect a barycentric shift of a rider in said chassis;
   a wheel controller configured to set a rotational velocity of said plurality of wheels based on said detected shift of the barycenter;
   a wheel velocity detector configured to detect the rotational velocity of said plurality of wheels, and a charging controller configured to compare said detected rotational velocity of the wheel and said set rotational velocity of the wheel and to charge a battery with regenerative energy from said motor when said detected rotational velocity of the wheel is faster than said set rotational velocity of the wheel.

* * * * *